United States Patent
Sung et al.

(10) Patent No.: US 12,390,796 B2
(45) Date of Patent: Aug. 19, 2025

(54) DIESEL OXIDATION CATALYST

(71) Applicant: BASF Corporation, Florham Park, NJ (US)

(72) Inventors: Shiang Sung, New York, NY (US); Patrick William McCanty, Caldwell, NJ (US); Stanley A. Roth, Yardley, PA (US); Xiaolai Zheng, Princeton Junction, NJ (US); Olga Gerlach, Ludwigshafen (DE); Markus Kögel, Römerberg (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 1225 days.

(21) Appl. No.: 16/924,667

(22) Filed: Jul. 9, 2020

(65) Prior Publication Data
US 2020/0346192 A1  Nov. 5, 2020

Related U.S. Application Data

(62) Division of application No. 15/548,657, filed as application No. PCT/US2016/016949 on Feb. 8, 2016, now Pat. No. 10,857,521.

(Continued)

(51) Int. Cl.
*B01J 35/00* (2024.01)
*B01D 53/94* (2006.01)
(Continued)

(52) U.S. Cl.
CPC ...... *B01J 23/6562* (2013.01); *B01D 53/9418* (2013.01); *B01D 53/944* (2013.01);
(Continued)

(58) Field of Classification Search
CPC .... B01D 2255/9025; B01D 2255/9155; B01D 2255/40; B01D 2255/30;
(Continued)

(56) References Cited

U.S. PATENT DOCUMENTS 5,362,463 A  11/1994  Stiles et al.
5,656,244 A   8/1997  Cole
(Continued)

FOREIGN PATENT DOCUMENTS

CN   102355951 A   2/2012
JP   H07-163871 A   6/1995
(Continued)

OTHER PUBLICATIONS

Notification of Reasons for Refusal issued in Japanese Patent Application No. 2017-559782, dated Jun. 10, 2021 (6 pgs).
(Continued)

*Primary Examiner* — Smita S Patel
(74) *Attorney, Agent, or Firm* — BASF Mobile Emissions Catalysts LLC

(57) ABSTRACT

An oxidation catalyst composite, methods, and systems for the treatment of exhaust gas emissions from a diesel engine are described. More particularly, described is an oxidation catalyst composite including a first oxidation component comprising a first refractory metal oxide support, palladium (Pd) and platinum (Pt); a $NO_x$ storage component comprising one or more of alumina, silica, titania, ceria, or manganese; and a second oxidation component comprising a second refractory metal oxide, a zeolite, and Pt. The oxidation catalyst composite is sulfur tolerant, adsorbs $NO_x$ and thermally releases the stored $NO_x$ at temperature less than 350° C.

8 Claims, 8 Drawing Sheets

Related U.S. Application Data

(60) Provisional application No. 62/113,696, filed on Feb. 9, 2015.

(51) Int. Cl.

| | | |
|---|---|---|
| *B01J 23/00* | (2006.01) | |
| *B01J 23/63* | (2006.01) | |
| *B01J 23/656* | (2006.01) | |
| *B01J 29/06* | (2006.01) | |
| *B01J 29/068* | (2006.01) | |
| *B01J 29/076* | (2006.01) | |
| *B01J 29/08* | (2006.01) | |
| *B01J 29/12* | (2006.01) | |
| *B01J 29/16* | (2006.01) | |
| *B01J 29/18* | (2006.01) | |
| *B01J 29/22* | (2006.01) | |
| *B01J 29/26* | (2006.01) | |
| *B01J 29/40* | (2006.01) | |
| *B01J 29/44* | (2006.01) | |
| *B01J 29/48* | (2006.01) | |
| *B01J 29/65* | (2006.01) | |
| *B01J 29/67* | (2006.01) | |
| *B01J 29/69* | (2006.01) | |
| *B01J 29/70* | (2006.01) | |
| *B01J 29/74* | (2006.01) | |
| *B01J 29/78* | (2006.01) | |
| *B01J 35/56* | (2024.01) | |
| *B01J 37/02* | (2006.01) | |
| *B01J 37/08* | (2006.01) | |
| *B01J 37/10* | (2006.01) | |
| *B01J 37/20* | (2006.01) | |
| *F01N 3/10* | (2006.01) | |
| *F01N 3/20* | (2006.01) | |

(52) U.S. Cl.
CPC ............ *B01J 23/002* (2013.01); *B01J 23/63* (2013.01); *B01J 29/061* (2013.01); *B01J 29/068* (2013.01); *B01J 29/076* (2013.01); *B01J 29/088* (2013.01); *B01J 29/126* (2013.01); *B01J 29/166* (2013.01); *B01J 29/185* (2013.01); *B01J 29/22* (2013.01); *B01J 29/26* (2013.01); *B01J 29/405* (2013.01); *B01J 29/44* (2013.01); *B01J 29/48* (2013.01); *B01J 29/655* (2013.01); *B01J 29/67* (2013.01); *B01J 29/69* (2013.01); *B01J 29/7057* (2013.01); *B01J 29/7065* (2013.01); *B01J 29/7415* (2013.01); *B01J 29/743* (2013.01); *B01J 29/7815* (2013.01); *B01J 29/783* (2013.01); *B01J 35/19* (2024.01); *B01J 35/56* (2024.01); *B01J 37/0236* (2013.01); *B01J 37/0244* (2013.01); *B01J 37/0246* (2013.01); *B01J 37/0248* (2013.01); *B01J 37/08* (2013.01); *B01J 37/10* (2013.01); *B01J 37/20* (2013.01); *F01N 3/106* (2013.01); *B01D 2255/1021* (2013.01); *B01D 2255/1023* (2013.01); *B01D 2255/2042* (2013.01); *B01D 2255/2065* (2013.01); *B01D 2255/2073* (2013.01); *B01D 2255/2092* (2013.01); *B01D 2255/30* (2013.01); *B01D 2255/40* (2013.01); *B01D 2255/9025* (2013.01); *B01D 2255/91* (2013.01); *B01D 2255/9155* (2013.01); *B01J 2523/00* (2013.01); *F01N 3/2066* (2013.01); *F01N 2370/02* (2013.01)

(58) Field of Classification Search
CPC .... B01D 2255/2092; B01D 2255/2073; B01D 2255/2065; B01D 2255/2042; B01D 2255/1023; B01D 2255/1021; B01D 2255/91; B01D 53/9418; B01D 53/944; B01D 53/94; B01J 2523/00; B01J 2523/25; B01J 2523/31; B01J 2523/3712; B01J 2523/41; B01J 2523/72; B01J 2523/824; B01J 2523/828; B01J 37/0244; B01J 37/0248; B01J 37/08; B01J 37/0236; B01J 37/20; B01J 37/10; B01J 37/02; B01J 37/0246; B01J 23/6562; B01J 23/63; B01J 23/002; B01J 29/405; B01J 29/088; B01J 29/22; B01J 29/076; B01J 29/068; B01J 29/26; B01J 29/7065; B01J 29/743; B01J 29/061; B01J 29/7057; B01J 29/126; B01J 29/166; B01J 29/69; B01J 29/783; B01J 29/655; B01J 29/44; B01J 29/185; B01J 29/67; B01J 29/7815; B01J 29/7415; B01J 35/19; B01J 35/56; B01J 29/48; B01J 35/0006; B01J 35/04; F01N 3/106; F01N 3/2066; F01N 2370/02
See application file for complete search history.

(56) References Cited

U.S. PATENT DOCUMENTS

| | | | |
|---|---|---|---|
| 5,804,526 A | 9/1998 | Satoh et al. | |
| 6,129,898 A * | 10/2000 | Watkins | ............... B01J 37/036 502/313 |
| 8,211,392 B2 | 7/2012 | Grubert et al. | |
| 8,449,852 B1 * | 5/2013 | Sung | ................ B01J 37/0205 502/514 |
| 8,568,674 B1 | 10/2013 | Sung et al. | |
| 2003/0021745 A1 | 1/2003 | Chen | |
| 2009/0320449 A1 | 12/2009 | Beutel et al. | |
| 2010/0180581 A1 | 7/2010 | Grubert | |
| 2010/0183490 A1 | 7/2010 | Hoke et al. | |
| 2010/0186375 A1 | 7/2010 | Sung et al. | |
| 2011/0305612 A1 | 12/2011 | Müller-Stach et al. | |
| 2012/0240554 A1 | 9/2012 | Qi et al. | |
| 2014/0193306 A1 | 7/2014 | Kadono et al. | |
| 2014/0271429 A1 | 9/2014 | Kazi et al. | |
| 2015/0165422 A1 * | 6/2015 | Sung | ..................... B01J 29/00 422/171 |

FOREIGN PATENT DOCUMENTS

| | | |
|---|---|---|
| JP | H8-503880 | 4/1996 |
| JP | 2007-000773 A | 1/2007 |
| JP | 2009-7946 A | 1/2009 |
| JP | 2012-515085 A | 7/2012 |
| JP | 2013-528119 A | 7/2013 |
| JP | 2014-226656 A | 12/2014 |
| KR | 10-2001-0037201 | 5/2001 |
| WO | WO 2010/083357 | 7/2010 |
| WO | WO 2011/154913 A1 | 12/2011 |
| WO | WO 2013/151557 A1 | 10/2013 |
| WO | WO 2014/026203 A2 | 2/2014 |
| WO | WO 2015/095058 A1 | 6/2015 |

OTHER PUBLICATIONS

International Preliminary Report on Patentability for counterpart International Patent Application No. PCT/US2016/016949, dated Aug. 15, 2017, 11 pages.

International Search Report for counterpart International Patent Application No. PCT/US2016/016949, dated May 20, 2016, 3 pages.

Supplementary European Search Report for counterpart European Patent Application No. 16 74 9650, dated Jul. 11, 2018, 2 pages.

* cited by examiner

DIESEL OXIDATION CATALYST

CROSS-REFERENCE TO RELATED APPLICATIONS

The present application is a divisional of U.S. application Ser. No. 15/548,657 filed Aug. 3, 2017, which is a U.S. National Phase Application of PCT/US2016/016949, filed Feb. 8, 2016, which claims priority to U.S. Provisional Patent Application No. 62/113,696, filed Feb. 9, 2015, the disclosures of which are incorporated herein by reference in their entirety.

TECHNICAL FIELD

The present invention relates to oxidation catalysts that include manganese and/or ceria. More specifically, embodiments are directed to layered oxidation catalyst composites comprising a $NO_x$ storage component comprising one or more of alumina, silica, titania, ceria, or manganese. The oxidation catalyst composites are sulfur tolerant and are used for low temperature $NO_x$ storage/release.

BACKGROUND

Operation of lean burn engines, for example, diesel engines and lean burn gasoline engines, provide the user with excellent fuel economy and have low emissions of gas phase hydrocarbons and carbon monoxide due to their operation at high air/fuel ratios under fuel lean conditions. Additionally, diesel engines offer significant advantages over gasoline (spark ignition) engines in terms of their fuel economy, durability, and their ability to generate high torque at low speed.

From the standpoint of emissions, however, diesel engines can present more severe problems than their spark-ignition counterparts. Because diesel engine exhaust gas is a heterogeneous mixture, emission problems relate to particulate matter (PM), nitrogen oxides ($NO_x$), unburned hydrocarbons (HC), and carbon monoxide (CO).

$NO_x$ is a term used to describe various chemical species of nitrogen oxides, including nitrogen monoxide (NO) and nitrogen dioxide ($NO_2$), among others. NO is of concern because it transforms into $NO_2$ in the upper atmosphere where it is believed to undergo a process known as photochemical smog formation, through a series of reactions in the presence of sunlight. Hydrocarbons are a concern because they are a significant contributor to acid rain. Ground level $NO_2$, on the other hand, has a high potential as an oxidant and is a strong lung irritant.

Effective abatement of $NO_x$ from lean burn engines is difficult to achieve because high $NO_x$ conversion rates typically require reductant-rich conditions. Conversion of the $NO_x$ component of exhaust streams to innocuous components generally requires specialized $NO_x$ abatement strategies for operation under fuel lean conditions. One of these strategies utilizes selective catalytic reduction (SCR) of $NO_x$, which involves the reaction of $NO_x$ in the presence of a reductant (e.g. urea) over a SCR catalyst, for example vanadia-titania based catalysts or zeolites promoted with a base metal such as Cu, Fe, or other base metals. A performance enhancement can be observed when there is an adequate ratio of $NO_2/NO_x$ in the feed gas to the SCR catalyst, especially in the low temperature range (i.e. <250° C.). Oxidation catalysts comprising a precious metal such as a platinum group metal (PGM) dispersed on a refractory metal oxide support are known for use in treating the exhaust of diesel engines to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from a diesel-powered engine to treat the exhaust before it vents to the atmosphere. Typically, the diesel oxidation catalysts are formed on ceramic or metallic carrier substrates (such as, e.g., a flow-through monolith carrier), upon which one or more catalyst coating compositions are deposited. In addition to the conversions of gaseous HC, CO, and the soluble organic fraction (SOF) of particulate matter, oxidation catalysts that contain platinum group metals (which are typically dispersed on a refractory oxide support) promote the oxidation of nitric oxide (NO) to nitrogen dioxide ($NO_2$).

Catalysts used to treat the exhaust of internal combustion engines are less effective during periods of relatively low temperature operation, such as the initial cold-start period of engine operation because the engine exhaust is not at a temperature sufficiently high enough for efficient catalytic conversion of noxious components in the exhaust. To this end, it is known in the art to include an adsorbent material, such as a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

Oxidation catalysts comprising a platinum group metal (PGM) dispersed on a refractory metal oxide support are known for use in treating exhaust gas emissions from diesel engines. Platinum (Pt) remains the most effective metal for oxidizing CO and HC in a DOC, after high temperature aging under lean conditions and in the presence of fuel sulfur. One of the major advantages of using palladium (Pd) based catalysts is the lower cost of Pd compared to Pt. However, Pd based diesel oxidation catalysts typically show higher light-off temperatures for oxidation of CO and HC, especially when used to treat exhaust containing high levels of sulfur (from high sulfur containing fuels) or when used with HC storage materials. The "light-off" temperature for a specific component is defined as the temperature at which 50% of that component reacts. Pd-containing DOCs may poison the activity of Pt to convert HCs and/or oxidize $NO_x$ and may also make the catalyst more susceptible to sulfur poisoning. These characteristics have typically limited the use of Pd-rich oxidation catalysts in lean burn operations, especially for light duty diesel application where engine temperatures remain below 250° C. for most driving conditions.

Original equipment manufacturers (OEM) have improved their engines to become more efficient. Due to increased efficiency, the exhaust gas temperatures have been dropping. Thus, there is an ongoing need to develop oxidation catalysts that address cold start $NO_x$ emissions. It would be desirable to provide a diesel oxidation catalyst (DOC) that provides enhanced $NO_2$ content of the exhaust gas exiting the DOC in order to improve downstream $NO_x$ removal, particularly the performance of downstream SCR catalysts. In use, SCR catalysts require introduction of an $NH_3$ precursor, typically aqueous urea which decomposes to $CO_2$ and $NH_3$ in the exhaust. Typically urea control strategies do not start introduction of urea at exhaust temperatures below 180° C., the temperature of urea hydrolysis to form $NH_3$. As the temperature of diesel exhaust is being lowered to improve fuel economy, a significant fraction of time is spent below 180°

C. Therefore another means is required to control $NO_x$ emissions until the exhaust temperature rises above 180° C.

SUMMARY

This invention discloses novel DOC formulations whereby $NO_x$ can be stored at low temperatures and thermally released into the SCR catalyst as exhaust temperatures rise to the point where urea can be injected into the exhaust activating the SCR catalyst. Of particular importance to this application is that the $NO_x$ adsorption component of this invention can be easily desulfated at temperatures achievable in filter regeneration (<650° C.) without requiring a rich desulfation strategy as typically is required for conventional Lean $NO_x$-traps (LNT).

A first aspect of the invention is directed to an oxidation catalyst. In one or more embodiments embodiment, an oxidation catalyst composite (e.g., suitable for abatement of exhaust gas emission from a lean burn engine) can comprise: a carrier substrate; and a catalytic coating on at least a portion of the carrier substrate, the catalytic coating including: a first oxidation component comprising at least one platinum group metal (PGM) and a first refractory metal oxide, wherein the first oxidation component is substantially free of zeolite; a $NO_x$ storage component comprising one or more of alumina, silica, titania, ceria, and manganese; and a second oxidation component comprising a second refractory metal oxide, a zeolite, and at least one PGM. In some embodiments, the oxidation catalyst composite can be configured such that one or more of the following conditions applies: the first oxidation component comprises platinum (Pt) and palladium (Pd) in a Pt to Pd weight ratio of about 0:1 to 4:1 (e.g., about 0.1:1 to about 4:1, about 0.5:1 to about 4:1, about 1:1 to about 4:1, about 2:1 to about 4:1, or about 3:1 to about 4:1); the first oxidation component is substantially free of zeolite; the $NO_x$ storage component is substantially free of zirconia; the $NO_x$ storage component is substantially free of Pt and Pd; the second oxidation component comprises Pt; the second oxidation component is substantially free of palladium.

In some embodiments, an oxidation catalyst can comprise: a carrier substrate having a length, an inlet end and an outlet end, a catalytic coating of an oxidation catalyst material on the carrier, the oxidation catalyst material including: a first oxidation component comprising a first refractory metal oxide support, platinum (Pt) and palladium (Pd), having a weight ratio of Pt to Pd in the range of about 0:1 to 4:1, wherein the first oxidation component is substantially free of zeolite; a $NO_x$ storage component comprising one or more of alumina, silica, titania, ceria, or manganese, wherein the $NO_x$ storage component is substantially free of zirconia and is substantially free of platinum and palladium; and a second oxidation component comprising a second refractory metal oxide, a zeolite, and platinum (Pt), and wherein the second oxidation component is substantially free of palladium.

In some embodiments, the first oxidation component is in an under layer on the carrier substrate, the $NO_x$ storage component is in a middle layer on the under layer, and the second oxidation component is in an upper layer on the middle layer.

In some embodiments, the first oxidation component is in an under layer on the carrier substrate, and the $NO_x$ storage component and the second oxidation component are mixed in a blended upper layer on the under layer.

In some embodiments, the first oxidation component and the $NO_x$ storage component are mixed and in a blended under layer on the carrier substrate, and the second oxidation component is in an upper layer on the blended under layer.

In some embodiments, the $NO_x$ storage component is an under layer on the carrier substrate, and the first oxidation component and the second oxidation component are in a zoned upper layer on the under layer.

In some embodiments, the first oxidation component is on the inlet end and the second oxidation component is on the outlet end.

In some embodiments, the first and second refractory metal oxide supports independently comprise one or more of alumina, silica, zirconia, titania, ceria, or manganese.

In some embodiments, the first oxidation component comprises platinum and palladium in an amount in the range of about 10 $g/ft^3$ to 200 $g/ft^3$, and wherein the second oxidation component comprises platinum in an amount in the range of about 10 $g/ft^3$ to about 120 $g/ft^3$.

In some embodiments, one or more of the first oxidation component, the $NO_x$ storage component, or the second oxidation component comprises manganese in an amount in the range of about 0.1 to 100 wt. %, based on the weight of the component containing manganese.

In some embodiments, the manganese is doped with Si, Fe, Co, Ni, Cu, In, Sn, Ir, Ce, Pr, or combinations thereof.

In some embodiments, one or more of the first oxidation component, the $NO_x$ storage component, or the second oxidation component comprises ceria (Ce) in an amount in the range of about 0.1 to 100 wt. %, based on the weight of the component containing ceria.

In some embodiments, the Ce is doped with an element selected from Si, Mn, Fe, Co, Ni, Cu, In, Sn, Ir, Pr, and combinations thereof.

In some embodiments, the $NO_x$ storage component comprises alumina in a range of about 80 to 99.8 wt. %, manganese in an amount in the range of about 0.1 to 10 wt. %, and ceria in an amount in the range of about 0.1 to 10 wt. %, based on the weight of the $NO_x$ storage component.

In some embodiments, the $NO_x$ storage component comprises ceria in a range of about 80 to 99.8 wt. %, alumina in an amount in the range of about 0.1 to 10 wt. %, and silica in an amount in the range of about 0.1 to 10 wt. %, based on the weight of the $NO_x$ storage component.

In some embodiments, the oxidation catalyst composite has a weight ratio of Mn/(Ce+Mn) greater than 0.4.

In some embodiments, the first oxidation component further comprises barium oxide in an amount in the range of about 3 to 100 $g/ft^3$.

In some embodiments, the second oxidation component comprises a hydrothermally stable zeolite selected from ZSM-5, beta, mordenite, Y-zeolite, a CHA framework type zeolite, ferrierite, or combinations thereof.

In some embodiments, the carrier substrate is selected from a flow-through monolith, a wall-flow monolith, a foam, or a mesh.

A second aspect of the invention is directed to a method for treating a diesel engine exhaust gas stream. In one or more embodiments, a method for treating a diesel engine exhaust gas stream comprises contacting an exhaust gas stream with the oxidation catalyst composite of the first through eighteenth embodiments, and passing the exhaust gas stream through a downstream SCR catalyst.

In some embodiments, the downstream SCR catalyst is disposed on a wall flow filter monolith.

A third aspect of the invention is directed to a system for treatment of a lean burn engine exhaust gas stream. In one or more embodiments, a system for treatment of a lean burn engine exhaust gas stream comprising hydrocarbons, carbon monoxide, nitrogen oxides, particulate matter and other exhaust components comprises: an exhaust conduit in fluid communication with a lean burn engine via an exhaust manifold; the oxidation catalyst composite of the first through eighteenth embodiments; and a catalyzed soot filter and an SCR catalyst located downstream from the oxidation catalyst composite.

In some embodiments, the SCR catalyst is present as a washcoat on the catalyzed soot filter.

In some embodiments, the SCR catalyst is on a flow through monolith downstream from the oxidation catalyst composite, and the catalyzed soot filter is downstream from the SCR catalyst.

In some embodiments, the catalyzed soot filter is downstream of the oxidation catalyst composite and the SCR catalyst is on a flow through monolith downstream from the catalyzed soot filter.

In some embodiments, the SCR catalyst comprises a molecular sieve having a double six ring (d6r) unit.

In some embodiments, the SCR catalyst is selected from CHA, AEI, or AFX framework type zeolite.

It is understood that the foregoing embodiments are not necessarily exclusive of one another. Rather, any two or more of the embodiments may be combined in any manner. Moreover, any specific elements from the embodiments may be combined in any manner. Thus, the present disclosure encompasses all combinations of elements from any two or more of the embodiments.

DETAILED DESCRIPTION

Figure 1:
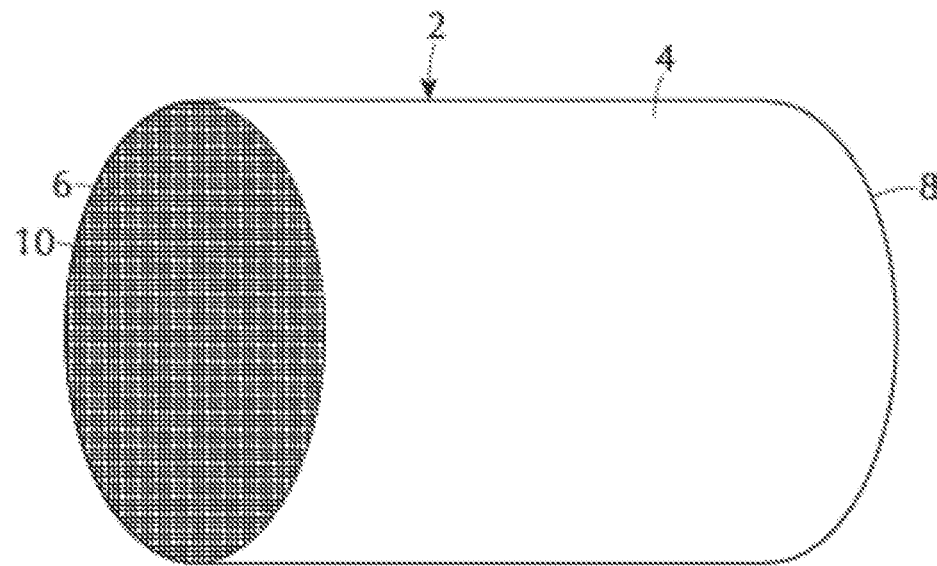
FIG. 1 is a perspective view of a honeycomb-type refractory carrier member which may comprise oxidation catalyst composites in accordance with one or more embodiments.

Before describing several exemplary embodiments of the invention, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed.

Original equipment manufacturers (OEMs) have improved their engines to become more efficient, and, as a result, the exhaust gas temperatures have been dropping. Thus, there is a need to address cold start $NO_x$ emission. One way to reduce total $NO_x$ emission is to adsorb $NO_x$, for example, through the use of basic alkali or alkaline earth components that trap $NO_2$. However, unlike the $NO_x$-trap catalysts, which hold the adsorbed $NO_x$ until the temperature rises beyond 450° C. or until the environment becomes rich (i.e. an air/fuel ratio less than the stoichiometric value), it is desired to have an adsorbent that thermally releases $NO_x$ at a temperature below 350° C. (the highest exhaust gas temperature during the Extra Urban Driving Cycle (EUDC)), so that the adsorbent can be re-used again. This kind of adsorption has sometimes been referred to as "Passive $NO_x$ Adsorption" or "Low Temperature Lean $NO_x$ Trap (LT-LNT)."

According to embodiments of the invention, it has been determined that incorporating manganese and/or ceria into an oxidation catalyst as a $NO_x$ storage component enhances the low temperature $NO_2$ storage/release of the exhaust gas exiting the DOC, and potentially the filter as well, thus improving the efficiency of the downstream SCR reaction. In one or more embodiments, the oxidation catalyst generates sufficient $NO_2$ for low temperature SCR of $NO_x$ over a SCR catalyst component located immediately downstream from the oxidation catalyst. In one or more embodiments, the objective is to release $NO_x$ from the DOC after the downstream SCR catalyst attains an exhaust temperature of 180° C., the point at which urea is injected into exhaust to control $NO_x$ emissions. In practice, this will be when the DOC inlet temperature will be in the interval of 200-350° C. or 200-400° C.

As used herein, "downstream" does not preclude there being an intervening catalyst between the oxidation catalyst and the SCR catalyst. Of course, a reductant injector will be located upstream from the SCR catalyst, and according to one or more embodiments, immediately upstream from the SCR catalyst. The reductant is typically a nitrogenous reductant such as ammonia or an ammonia precursor such as urea or a urea solution.

As is known in the art, SCR of $NO_x$ in the presence of ammonia includes the following reactions:

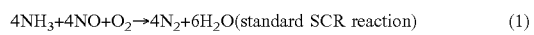
$$4NH_3+4NO+O_2 \rightarrow 4N_2+6H_2O \text{(standard SCR reaction)} \quad (1)$$

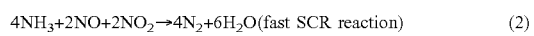
$$4NH_3+2NO+2NO_2 \rightarrow 4N_2+6H_2O \text{(fast SCR reaction)} \quad (2)$$

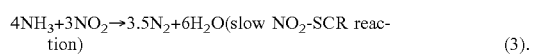
$$4NH_3+3NO_2 \rightarrow 3.5N_2+6H_2O \text{(slow } NO_2\text{-SCR reaction)} \quad (3).$$

Reaction "(2)" is referred to as the fast SCR reaction. Applicants have determined that when a SCR catalyst is immediately downstream from the diesel oxidation catalyst, for example, when a SCR catalyst is on a filter, or when the SCR catalyst is on a flow through substrate downstream from the DOC, hydrocarbons tend to inhibit the fast SCR reaction. In addition, at low temperatures, for example, between 150° C. and 300° C., or between 150° C. and 250° C., conventional diesel oxidation catalysts do not provide sufficient $NO_2$ to promote SCR of $NO_x$ at temperatures below 300° C. and 250° C. The diesel oxidation catalyst according to one or more embodiments of the invention promotes SCR of $NO_x$ at low temperatures, for example below 300° C., and in some embodiments below 250° C. In one or more embodiments, the diesel oxidation catalyst traps HC, preventing the HC from inhibiting the fast SCR reaction at the SCR catalyst downstream from the diesel oxidation catalyst.

According to one or more embodiments, an oxidation catalyst composite comprises a carrier substrate having a length, an inlet end and an outlet end, a catalytic coating of an oxidation catalyst material on the carrier, the oxidation catalyst material comprising a first oxidation component, a second oxidation component, and a $NO_x$ storage component. In one or more embodiments, the first oxidation component comprises a first refractory metal oxide support, platinum (Pt) and palladium (Pd) component, having a weight ratio of Pt to Pd in the range of about 0:1 to 4:1; the $NO_x$ storage component comprises one or more of alumina, silica, titania, ceria, or manganese, wherein the $NO_x$ storage component is substantially free of zirconia and is substantially free of platinum and palladium; and the second oxidation component comprises a zeolite, platinum (Pt), and a second refractory metal oxide, wherein the second washcoat is substantially free of palladium.

With respect to the terms used in this disclosure, the following definitions are provided.

As used herein, the term "catalyst composite" refers to a catalytic article including a carrier substrate, for example a honeycomb substrate, having one or more washcoat layers containing a catalytic component, for example, a platinum group metal component, that is effective to catalyze oxidation of CO, HC, and NO.

As used herein, the term "catalyst" or "catalyst composition" or "catalyst material" refers to a material that promotes a reaction.

As used herein, the term "catalytic coating" refers to a content of a catalyst, catalyst composition, or catalyst material that is provided in or on a support or carrier. A catalytic coating can be a single layer of a catalyst, catalyst composition, or catalyst material, can be multiple layers of the same a catalyst, catalyst composition, or catalyst material, can be multiple layers that include different catalysts, catalyst compositions, or catalyst materials, or can be present in pores in a surface of a support or other carrier.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried and calcined to provide the porous washcoat. The term "washcoat" can encompass a single layer coating or a multilayer coating. For example, a plurality of catalyst compositions may be combined and applied as a washcoat to form a single layer of a catalytic coating. In another example, a first catalyst composition can be applied as a washcoat to form a first layer, and a second catalyst composition can be applied as a washcoat to form a second layer, and the layers together can comprise a catalytic coating.

As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina, silica, titania, and other materials are known for such use. One or more embodiments of the present invention include a refractory metal oxide support comprising an activated compound selected from the group consisting of alumina, zirconia, silica, titania, ceria, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, or zirconia-titania, or combinations thereof. Although many of these materials suffer from the disadvantage of having a considerably lower BET surface area than activated alumina, that disadvantage tends to be offset by a greater durability or performance enhancement of the resulting catalyst. As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

In one or more embodiments, the first and second oxidation components comprise first and second refractory metal oxide supports independently comprising one or more of alumina, silica, zirconia, titania, ceria, or manganese. The first and second refractory metal oxide supports can be the same or different.

In one or more embodiments, the $NO_x$ storage component is substantially free of zirconia. As used herein, the term "substantially free of zirconia" means that there is no zirconia intentionally added to the $NO_x$ storage component, and that there is generally less than about 1% of zirconia by weight in the $NO_x$ storage component.

In one or more specific embodiments, the $NO_x$ storage component comprises alumina, manganese, and ceria. In other specific embodiments, the $NO_x$ storage component comprises ceria, alumina, and silica. In still further embodiments, the $NO_x$ storage component comprises alumina, silica, ceria, and manganese.

According to one or more embodiments, one or more of the first oxidation component, the $NO_x$ storage component, or the second oxidation component comprise manganese (Mn). It will be appreciated by one of skill in the art, that upon calcination, the manganese will become one or more forms of manganese oxide ($Mn_xO_y$). In one or more embodiments, the manganese content is in the range of 0.1% to 100%, including 0.1, 5, 10, 20, 30, 40, 50, 60, 70, 80, 90, and 100% by weight, based on the weight of the individual components (i.e. based on the weight of the first oxidation component, the $NO_x$ storage component, and/or the second oxidation component). In other embodiments, the manganese content is in the range of 1 to 100%, or 2 to 100%, or 1 to 10%. In one or more specific embodiments, the first oxidation component comprises manganese in an amount in the range of about 1 to about 10%, based on the weight of the first oxidation component.

In one or more embodiments, the manganese can be incorporated into the individual components of the oxidation catalyst composite either in bulk form or surface forms, or as discrete manganese oxide ($Mn_xO_y$) forms. In one or more embodiments, the manganese is derived from a soluble manganese species selected from manganese acetate, manganese nitrate, manganese sulfate, or combinations thereof. In other embodiments, the manganese is derived from bulk manganese oxides selected from MnO, $Mn_2O_3$, $MnO_2$, and combinations thereof.

According to one or more embodiments, a refractory metal oxide support is impregnated with a manganese salt. As used herein, the term "impregnated" means that a manganese-containing solution is put into pores of a material such as a zeolite or a refractory metal oxide support. In detailed embodiments, impregnation of metals is achieved by incipient wetness, where a volume of diluted manganese-containing solution is approximately equal to the pore volume of the support bodies. Incipient wetness impregnation generally leads to a substantially uniform distribution of the solution of the precursor throughout the pore system of the material. Other methods of adding metals are also known in the art and can be used.

Thus, according to one or more embodiments, a refractory metal oxide support is treated with a solution of manganese dropwise, in a planetary mixer to impregnate the support with the source of manganese.

In one or more embodiments, the manganese can be doped with one or more metals selected from Si, Fe, Co, Ni, Cu, In, Sn, Ir, Ce, and Pr. It will be appreciated that in such cases when the manganese is doped with one or more metals, a mixed oxide can form.

In one or more embodiments, the $NO_x$ storage component comprises alumina, manganese in an amount in the range of about 0.1 to 10 wt. %, and ceria in an amount in the range of about 0.1 to 10 wt. %, based on the weight of the composite $NO_x$ storage component. In such embodiments, it will be appreciated by one skilled in the art, that the alumina is present in amounts of about 80 wt. % up to about 99.8 wt. %. In specific embodiments, the $NO_x$ storage component comprises about 90 wt. % alumina, 5 wt. % $MnO_2$, and 5 wt. % $CeO_2$. In one or more specific embodiments, the $NO_x$ storage component has a weight ratio of Mn/(Ce+Mn) greater than 0.4, including greater than 0.5, greater than 0.55, greater than 0.60, greater than 0.65, greater than 0.7, greater than 0.75, greater than 0.8, greater than 0.85, greater than 0.9, greater than 0.95. In one or more embodiments, the $NO_x$ storage component has a ratio of Mn/(Ce+Mn) of about 1. In some embodiments, $NO_x$ storage component has a ratio of Mn/(Ce+Mn) of about 0.4 to about 3, about 0.5 to about 2.5, about 0.6 to about 2, or about 0.75 to about 1.5. The ratio of Mn/(Ce+Mn) is a wt. % ratio as oxide, MnO/($CeO_2$+MnO).

Without intending to be bound by theory, it is thought that manganese on alumina improves the resistance to sulfur poisoning. As used herein, the terms "sulfur aging" or "sulfur tolerance" or "sulfur resistance" refer to the capability of an oxidation catalyst to oxidize NO, CO, and HC, which is contained in the exhaust gas, also after the influence of sulfur oxides ($SO_x$). Of particular importance to this application is that the $NO_x$ adsorption component of this invention can be easily desulfated at temperatures achievable in filter regeneration (<650° C.) without requiring a rich desulfation strategy as typically is required for conventional $NO_x$-traps. Without intending to be bound by theory, it is thought that ceria/silica/alumina improves the resistance to sulfur poisoning in a manner similar to that for manganese/ceria.

In other embodiments, the $NO_x$ storage component comprises ceria, alumina in an amount in the range of about 0.1 to 10 wt. %, and silica in an amount in the range of about 0.1 to 10 wt. %, based on the weight of the $NO_x$ storage component. In such embodiments, it will be appreciated by one skilled in the art, that the ceria is present is present in amounts of about 80 wt. % up to about 99.8 wt. %. In a specific embodiment, the $NO_x$ storage component comprises ceria in an amount of about 96 wt. %, silica in an amount of about 1 wt. %, and alumina as a binder in an amount of about 3 wt. %.

In one or more embodiments, the ceria is doped with an element selected from Si, Mn, Fe, Co, Ni, Cu, In, Sn, Ir, Pr, and combinations thereof.

According to one or more embodiment, the $NO_x$ storage component is substantially free of platinum and palladium. As used herein, the term "substantially free of platinum and palladium" means that there is no platinum and palladium intentionally added to the $NO_x$ storage component, and that there is generally less than about 0.1% of platinum and palladium by weight in the $NO_x$ component. It will be appreciated by one of skill in the art, however, that during loading/coating trace amounts of platinum and palladium may migrate from one component of a catalytic coating to another, such that trace amounts of platinum and palladium can be present in the $NO_x$ storage component.

According to one or more embodiments, the first oxidation component is substantially free of zeolite. As used herein, the term "substantially free of zeolite" means that there is no zeolite intentionally added to the first oxidation component, and that there is generally less than about 1% of zeolite by weight in the first oxidation component.

According to one or more embodiments, the first oxidation component comprises a first refractory metal oxide support selected from one or more of silica, alumina, zirconia, titania, ceria or manganese, a platinum (Pt) component and a palladium (Pd) component. The ratio of platinum to palladium in the first catalytic coating layer can be varied over a wide range. Generally, there are no specific restrictions as far as the platinum to palladium weight ratio of the first oxidation component is concerned. In one or more embodiments, the platinum to palladium weight ratio of the first oxidation component can be in the range of from about 0:1 to 4:1, including 0:1, 1:1, 2:1, 3:1, and 4:1. For example, the Pt:Pd weight ratio can be about 0.1:1 to 4:1, about 0.5:1 to 4:1, about 1:1 to about 4:1, about 2:1 to about 4:1, or about 3:1 to about 4:1. In one or more embodiments, the loading of platinum and palladium in the first oxidation component can be in the range of about 10 g/ft$^3$ to 200 g/ft$^3$. Generally, there are no specific restrictions as far as the palladium content of the first oxidation component is concerned. There are also no specific restrictions as far as the platinum content of the first oxidation component is concerned. In specific embodiments, the loading of Pt in the first oxidation component can be in the range of about 2 g/ft$^3$ to 40 g/ft$^3$, and the loading of Pd in the first oxidation component can be in the range of about 10 g/ft$^3$ to 200 g/ft$^3$. In one or more embodiments, the total PGM loading can be from about 10 to about 200 g/ft$^3$.

According to one or more embodiments, the oxidation catalyst composite includes an adsorbent material, which comprises a zeolite, in order to absorb gaseous pollutants, usually hydrocarbons, and retain them during the initial cold-start period. As the exhaust temperature increases, the adsorbed hydrocarbons are driven from the adsorbent and subjected to catalytic treatment at the higher temperature. Thus, in one or more embodiments, the second oxidation component comprises a zeolite, platinum (Pt), and a second refractory metal oxide, wherein the second oxidation component is substantially free of palladium. As used herein, the term "substantially free of palladium" means that there is no palladium intentionally added to the second oxidation component, and that there is generally less than about 0.1% of palladium by weight in the second oxidation component. It will be appreciated by one of skill in the art, however, that during loading/coating trace amounts of palladium may migrate from one component of a catalytic coating to another, such that trace amounts of palladium can be present in the second oxidation component. Thus, when the second oxidation component is substantially free of palladium, the second oxidation component may include trace amounts of palladium, such as in the range of less than about 0.05%, less than about 0.025%, or less than about 0.01% by weight relative to the total weight of the second oxidation component.

As used herein, the term "molecular sieves", such as zeolites, refer to materials, which may in particulate form support catalytic precious group metals, the materials having a substantially uniform pore distribution, with the average pore size being no larger than 20 Å.

Typically, any structure types of zeolites/aluminosilicates can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

The zeolite can be a natural or synthetic zeolite such as faujasite, chabazite, clinoptilolite, mordenite, silicalite, zeolite X, zeolite Y, ultrastable zeolite Y, ZSM-5, ZSM-12, SSZ-3, SAPO 5, offretite, or a beta zeolite. In specific embodiments, the zeolite has a high silica to alumina ratio (SAR). The zeolite may have a silica:alumina molar ratio of from at least 25, specifically at least 50, with useful ranges of from 25 to 1000, 50 to 500 as well as 25 to 300, from 100 to 250, or alternatively from 35 to 180 is also exemplified. In one or more specific embodiments, the zeolite is beta zeolite with a SAR of about 30 to 150 or a SAR of >500.

In one or more embodiments, the second oxidation component comprises a hydrothermally stable zeolite selected from ZSM-5, beta zeolite, mordenite, Y zeolite, a CHA framework type zeolite, ferrierite, or combinations thereof. In a specific embodiment, the second oxidation component comprises beta zeolite. In one or more embodiments, the second oxidation component comprises a zeolite in a total amount of from 0.1 to 1 g/in$^3$, including 0.3 to 0.8 g/in$^3$, 0.35 to 0.75 g/in$^3$, and 0.35 to 0.5 g/in$^3$. In a specific embodiment, the second oxidation component comprises a zeolite in a total amount of about 0.5 g/in$^3$.

Each of the components of the oxidation catalyst composite according to the present invention can be formed from a catalytic coating (e.g., applied as a washcoat) that contains the respective support material as described above. Other additives such as binders and stabilizers can also be included in the washcoat use to form the catalytic coating. As disclosed in U.S. Pat. No. 4,727,052, porous support materials, such as activated alumina, can be thermally stabilized to retard undesirable alumina phase transformations from gamma to alpha at elevated temperatures. Stabilizers can be selected from alkaline earth metal components selected from the group consisting of magnesium, barium, calcium and strontium. When present, stabilizer materials can be added in an amount from about 0.01 g/in$^3$ to about 0.15 g/in$^3$ in the coating.

In one or more embodiments, the first oxidation component can further comprise an alkaline earth metal selected from Mg, Ca, Sr, or Ba. In a specific embodiment, the first oxidation component further comprises Ba, specifically barium oxide. The alkaline earth can be present in an amount of from about 3 to about 100 g/ft$^3$ (including 3, 5, 10, 15, 20, 25, 30, 35, 40, 45, 50, 55, 60, 65, 70, 75, 80, 85, 90, 95, and 100 g/ft$^3$).

Generally, there are no specific restrictions as far as the washcoat loading of each individual component in the oxidation catalyst is concerned. In one or more embodiments, one or more of the first oxidation component, the NO$_x$ storage component, and the second oxidation component can have a washcoat loading in the range of 0.1 g/in$^3$ to 6.0 g/in$^3$.

In one or more embodiments, the oxidation catalyst including the NO$_x$ storage component, and the first and second oxidation components is then applied to a ceramic or metallic flow-through monolith, or to a wall flow filter. As used herein, the term "layer" is used to denote the location of the diesel oxidation catalyst on the carrier substrate. It will be appreciated that there is no particular order to the layering of the catalytic coating components.

In one or more embodiments, the first oxidation component and the NO$_x$ storage component are mixed. In other embodiments, the NO$_x$ storage component and the second oxidation component are mixed. It will be appreciated by one of skill in the art that the mixing of components can be uniform, but in some cases localized concentrations of the individual components may be preferred in the coating layer to mitigate negative interactions, for example minimization of Pt and ceria interaction may be beneficial.

In one or more embodiments, the first oxidation component is an under layer on the carrier substrate, the NO$_x$ storage component is a middle layer on the under layer, and the second oxidation component is an upper layer on (or over) the middle layer.

In other embodiments, the first oxidation component is an under layer on the carrier substrate, and the NO$_x$ storage component and the second oxidation component are mixed in a blended upper layer on the under layer.

In still further embodiments, the first oxidation component and the NO$_x$ storage component are mixed and in a blended under layer on the carrier substrate, and the second oxidation component is in an upper layer on (or over) the blended under layer.

In one or more embodiments, the NO$_x$ storage component is an under layer on the carrier substrate, and the first oxidation component and the second oxidation component are in a zoned relationship in a zoned upper layer on (or over) the under layer. In such embodiments, the first oxidation component can be on the upstream end and the second oxidation component can be located on the downstream end. In other embodiments, the second oxidation component can be on the upstream end and the first oxidation component can be located on the downstream end.

It will be appreciated by one skilled in the art that the upstream zone and downstream zones can be at least partially overlapping. In one or more embodiments the upstream zone is at least partially overlapping the downstream zone. In other embodiments, the downstream zone is at least partially overlapping the upstream zone.

In one or more embodiments, the upstream zone and the downstream zone may be directly abutting one another. In still further embodiments, there may be a gap between the upstream zone and the downstream zone.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

According to one or more embodiments, the oxidation catalyst composite can further comprise an undercoat layer located between the carrier substrate and the under layer. In one or more embodiments, the undercoat layer comprises alumina, specifically gamma-alumina. In embodiments where the undercoat layer is present, the undercoat layer is coated over the carrier substrate, and then the under layer can be coated over (on top) of the undercoat layer. In one or more embodiments, the undercoat layer can comprise one or more platinum group metals and/or zeolite.

The Carrier Substrate

As used herein, the terms "carrier" and "substrate" refer to the monolithic material onto which the refractory metal oxide support is placed, typically in the form of a catalytic coating containing a plurality of supports having catalytic species thereon. According to one or more embodiments, the substrate may be any of those materials typically used for preparing DOC catalysts and will typically comprise a foam, a metal, or a ceramic honeycomb structure. Any suitable substrate may be employed, such as a monolithic substrate of the type having a plurality of fine, parallel gas flow passages extending therethrough from an inlet to an outlet face of the substrate, such that passages are open to fluid flow therethrough. The passages, which are essentially straight paths from their fluid inlet to their fluid outlet are defined by walls in which the catalytic material is coated as a "washcoat" so that the gases flowing through the passages contact the catalytic material. A washcoat is formed by preparing a slurry containing a specified solids content (e.g., 30-50% by weight) of supports in a liquid medium, which is then coated onto a carrier substrate and dried to provide a catalytic coating layer.

The flow passages of the monolithic substrate are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic substrate may be made of any suitable refractory material, e.g., cordierite, cordierite-α alumina, silicon nitride, silicon carbide, aluminum titanate, zirconium mullite, spodumene, alumina-silica magnesia, zirconiumn silicate, sillimanite, magnesium silicates, zirconian, petalite, α-alumina, aluminosilicates and the like.

The substrates useful for the oxidation catalyst composites according to one or more embodiments may also be metallic in nature and may be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component.

Preparation of Catalyst Composites

The oxidation catalyst composites according to one or more embodiments may be formed in a single layer or in multiple layers, including at least two layers, and at least three layers. In some circumstances, it may be suitable to prepare one slurry of catalytic material and use this slurry to form multiple layers on the substrate. The oxidation catalyst composites can be prepared by known processes, e.g. incipient wetness. A representative process is set forth below.

The oxidation catalyst composite can be prepared in layers on a monolith substrate. For a first layer of a specific catalytic coating, finely divided particles of a high surface area refractory metal oxide such as gamma alumina are slurried in an appropriate vehicle, e.g. water. The substrate may then be dipped one or more times in such slurry or the slurry may be coated on the substrate such that there will be deposited on the substrate the desired loading of the metal oxide. To incorporate components such as precious metals (e.g. palladium, platinum, rhodium, and/or combinations) and stabilizers and/or promoters, such components may be incorporated in the slurry prior to substrate coating as a mixture of water soluble or water-dispersible compounds or complexes. Or alternatively the precious metals, stabilizers and promoters may be added as a water-dispersible solution after the slurry is applied to the monolith substrate. Thereafter, the coated substrate is calcined by heating, e.g., at 400-600° C. for about 10 minutes to about 4 hours. When platinum and/or palladium are desired, the platinum and palladium component are used in the form of compounds or complexes to achieve dispersion of the components on the refractory metal oxide support, e.g. activated alumina. As used herein, the term "platinum component" and "palladium component" refer to any compound, complex, or the like which, upon calcinations or use thereof, decomposes or otherwise converts to a catalytically active form, usually the metal or the metal oxide. Generally, aqueous solutions of soluble compounds or complexes of the precious metals are used. Non-limiting examples of suitable compounds include palladium nitrate, tetraammine palladium nitrate, platinum chloride, tetraammine platinum acetate, and platinum nitrate. During the calcination steps, or at least during the initial phase of use of the composite, such compounds are converted into a catalytically active form of the metal or a compound thereof.

A suitable method of preparing any layer of the layered catalyst composite is to prepare a mixture of a solution of a desired precious metal compounds (e.g., platinum compound and/or a palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds and/or stabilizers, e.g., barium acetate, and a promoter, e.g., lanthanum nitrate, may be added to the slurry.

In one or more embodiments, the particulates in the slurry are pulverized to result in substantially all of the solids having particle sizes of less than 18 micron. The pulverization may be accomplished in a ball mill or other similar equipment, and the solids content of the slurry may be, e.g., about 20-60 wt. % or 30-40 wt. %.

Additional layers, i.e., second layer may be prepared and deposited upon the first layer in the same manner as described for the deposition of the first layer upon the substrate.

Figure 2:
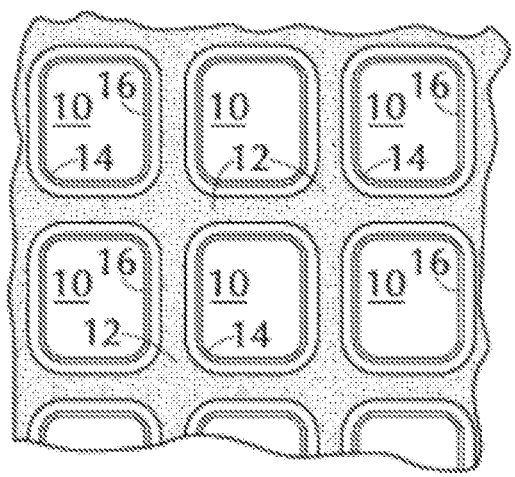
FIG. 2 is a partial cross-sectional view enlarged relative to FIG. 1, which shows an enlarged view of one of the gas flow passages shown in FIG. 1.

The oxidation catalyst composite according to one or more embodiments may be more readily appreciated by references to FIG. 1. FIG. 1 shows a refractory substrate member 2, in accordance with one or more embodiments. Referring to FIG. 1, the refractory substrate member 2 is a cylindrical shape having a cylindrical outer surface 4, an upstream end face 6 and a downstream end face 8, which is substantially identical to end face 6. Substrate member 2 has a plurality of fine, parallel gas flow passages 10 formed therein. As see in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As is more easily seen in FIG. 2, walls 12 are so dimensioned and configured that gas flow passages 10 have a substantially regular polygonal shape, substantially square in the illustrated embodiment, but with rounded corners as described in U.S. Pat. No. 4,335,023, which is incorporated herein by reference. A catalytic coating layer 14 is adhered to or coated onto the walls 12 of the substrate member. As shown in FIG. 2, an additional catalytic coating layer 16 is coated over the catalytic coating layer 14. In one or more embodiments, a third catalytic coating layer (not shown) can be applied to the substrate beneath. As will be appreciated by one of skill in the art, the catalytic coating layer 14 can comprise the first oxidation component, the $NO_x$ storage component, the second oxidation component, or combinations thereof, according to one or more embodiments. The additional catalytic coating layer 16 can comprise the first oxidation component, the $NO_x$ storage component, the second oxidation component, or combinations thereof, according to one or more embodiments. In one or more embodiments, a third catalytic coating layer (not shown) can be applied to the substrate beneath, and can comprise the first oxidation component, the $NO_x$ storage component, the second oxidation component, or combinations thereof, according to one or more embodiments. Accordingly, the walls 12 of the substrate 2 can include one catalytic coating layer, two catalytic coating layers, three catalytic coating layers, or more catalytic coating layers as desired. A single catalytic coating layer may include one component, two components, three components, or more components. For example, a single catalytic coating layer may comprise only one of the first oxidation component, the $NO_x$ storage component, and the second oxidation component. In some embodiments, a single catalytic coating layer may comprise the first oxidation component and the $NO_x$ storage component. In some embodiments, a single catalytic coating layer may comprise the first oxidation component and the second oxidation component. In some embodiments, a single catalytic coating layer may comprise the $NO_x$ storage component and the second oxidation component. In some embodiments, a single catalytic coating layer may comprise all of the first oxidation component, the $NO_x$ storage component, and the second oxidation component. One or a plurality of catalytic coating layers may be applied to the walls 12 of the substrate 2 so that the walls are coated with all of the first oxidation component, the $NO_x$ storage component, and the second oxidation component.

As shown in FIG. 2, the substrate member 2 includes void spaces provided by the gas-flow passages 10, and the cross-sectional area of these passages 10 and the thickness of the walls 12 defining the passages will vary from one type of substrate member to another. Similarly, the weight of catalytic coating applied to such substrates will vary from case to case. Consequently, in describing the quantity of catalytic coating or catalytic metal component or other component of the composition, it is convenient to use units of weight of component per unit volume of catalyst substrate. Therefore, the units grams per cubic inch ("g/in$^3$") and grams per cubic foot ("g/ft$^3$") are used herein to mean the weight of a component per volume of substrate member, including the volume of void spaces of the substrate member.

Figure 3:
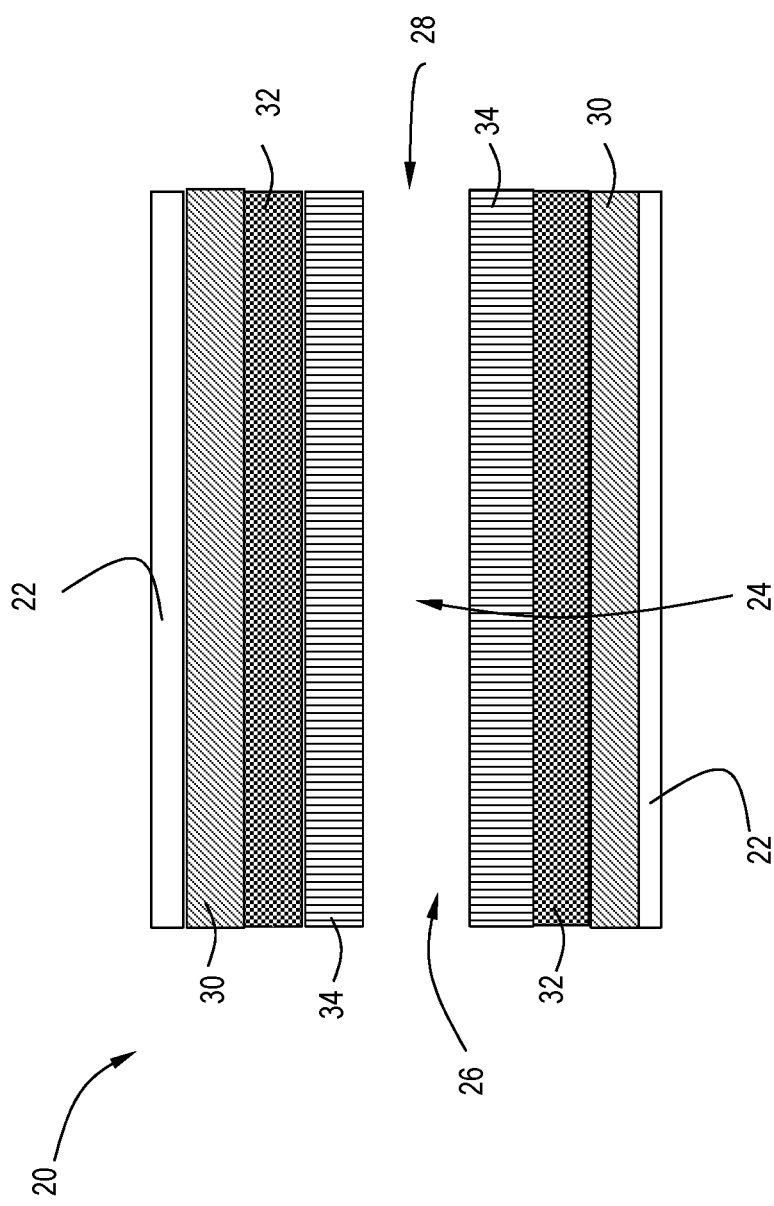
FIG. 3 shows a cross-sectional view of oxidation catalyst composites according to various embodiments.
Figure 4:
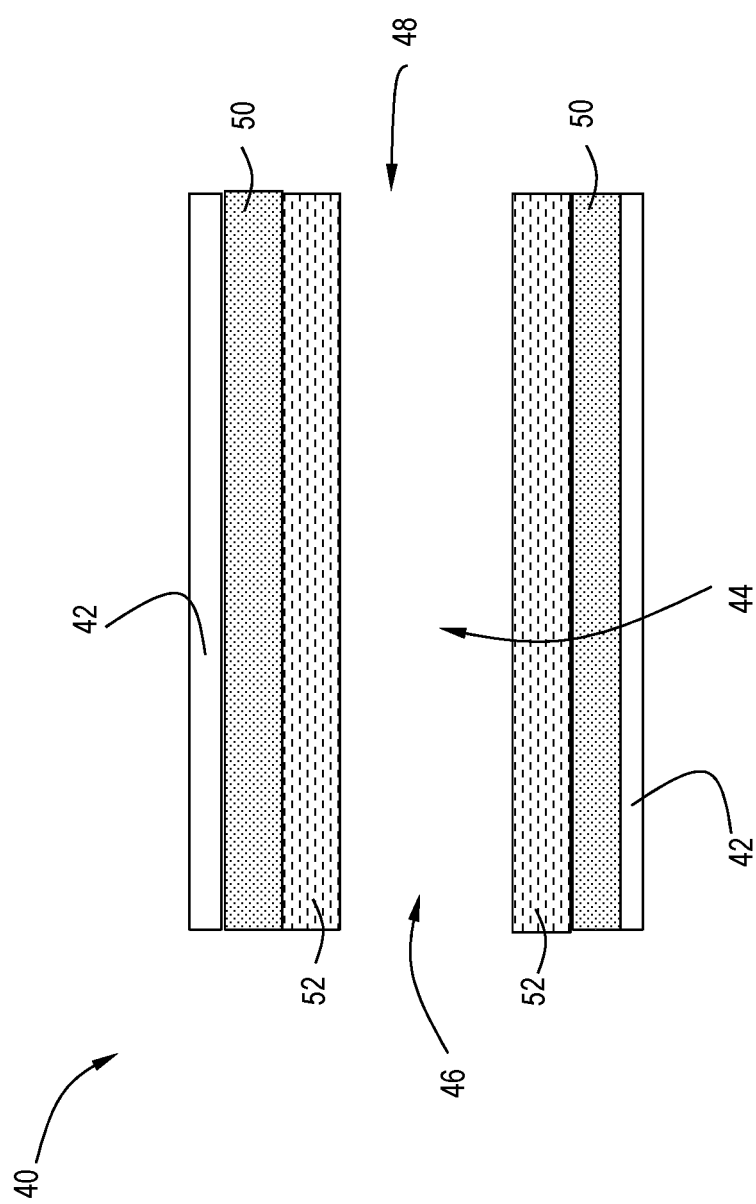
FIG. 4 shows a cross-sectional view of oxidation catalyst composites according to various embodiments.
Figure 5:
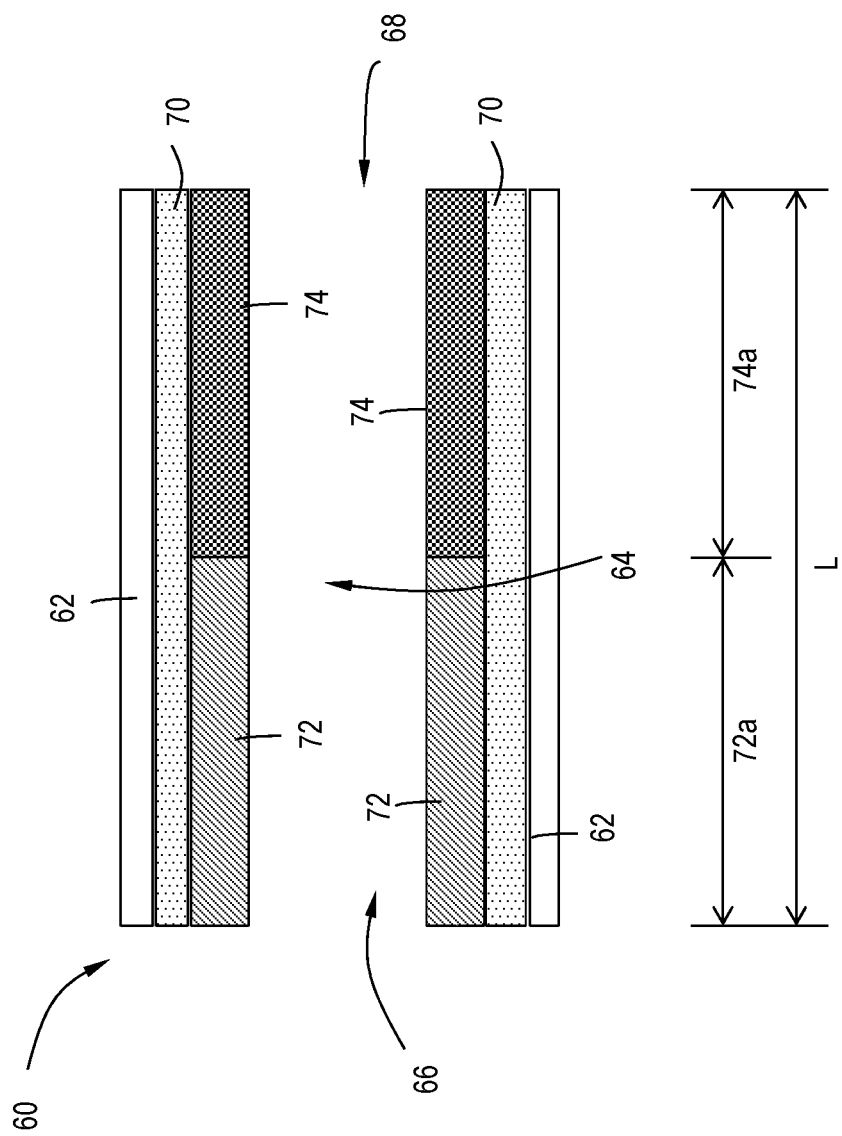
FIG. 5 shows a cross-sectional view of oxidation catalyst composites according to various embodiments.

The oxidation catalyst composite according to one or more embodiments including the first oxidation component, the $NO_x$ storage component, and the second oxidation component may be more easily understood by reference to FIGS. 3-5. FIG. 3 shows an embodiment of a layered oxidation catalyst composite 20 for abatement of exhaust gas emissions from a diesel engine. In one or more embodiments, the substrate 22 generally comprises a plurality of channels 24 of a honeycomb substrate, of which only one channel is shown in cross-section for clarity. The substrate 22 has an inlet or upstream end 26 and an outlet or downstream end 28 and contains three separate catalytic coating layers. In one or more embodiments, the first oxidation component is an under layer 30 on the substrate 22; the $NO_x$ storage component of one or more embodiments is a middle layer 32 on the under layer 30; and the second oxidation component is an upper layer 34 on the middle layer 32. According to one or more embodiments, the oxidation catalyst composite can further comprise an undercoat layer (not shown) located between the substrate 22 and the under layer 30. In one or more embodiments, the undercoat layer comprises alumina, specifically gamma-alumina. In embodiments where the undercoat layer is present, the undercoat layer is coated over the substrate 22, and then the first oxidation component is in an under layer 30 coated over (on top) of the undercoat layer. In one or more embodiments, the undercoat layer can comprise one or more platinum group metals and/or zeolite. Thus, the substrate 22 can be coated successively with an optional undercoat, an under layer 30, a middle layer 32, and an upper layer 34. In some embodiments, the undercoat, the under layer 30, the middle layer 32, and the upper layer 34 can each comprise a single composition (e.g., the alumina component, the first oxidation component, the $NO_x$ storage component, or the second oxidation component).

FIG. 4 shows an embodiment of a layered oxidation catalyst composite 40 for abatement of exhaust gas emission from a diesel engine. In one or more embodiments, the substrate 42 generally comprises a plurality of channels 44 of a honeycomb substrate, of which only one channel is shown in cross-section for clarity. The substrate 42 has an inlet or upstream end 46 and an outlet or downstream end 48 and contains two separate catalytic coating layers. In one or more embodiments, the first oxidation component is an under layer 50 on the substrate 42, and the $NO_x$ storage component and the second oxidation component are mixed to form a blended upper layer 52 on the under layer 50.

According to one or more embodiments, the oxidation catalyst composite can further comprise an undercoat layer (not shown) located between the substrate 42 and the under layer 50. In one or more embodiments, the undercoat layer comprises alumina, specifically gamma-alumina. In embodiments where the undercoat layer is present, the undercoat layer is coated over the substrate 42, and then the first oxidation component is in an under layer 50 coated over (on top) of the undercoat layer, and the $NO_x$ storage component and the second oxidation component are mixed to form a blended upper layer 52 on the under layer 50. In one or more embodiments, the undercoat layer can comprise one or more platinum group metals and/or zeolite.

Referring to FIG. 4, in other embodiments, the first oxidation component and the $NO_x$ storage component are mixed and form a blended under layer 50 on the substrate 42, and the second oxidation component is an upper layer 52 on the blended under layer 50. According to one or more embodiments, the oxidation catalyst composite can again further comprise an undercoat layer (not shown) located between the substrate 42 and the under layer 50. In embodiments where the undercoat layer is present, the undercoat layer is coated over the substrate 42, and then the first oxidation component and the $NO_x$ storage component are mixed and form a blended under layer 50 coated over (on top) of the undercoat layer, and the second oxidation component is an upper layer 52 on the under layer 50. Thus, the substrate 42 can be coated successively with an optional undercoat, an under layer 50, and an upper layer 52. In some embodiments, one of the under layer 50 and the upper layer 52 can comprise a single composition (e.g., the first oxidation component or the second oxidation component), and the other of the under layer 50 and the upper layer 52 can comprise a blend of compositions (e.g., a blend of the first oxidation component and the $NO_x$ storage component, or a blend of the second oxidation component and the $NO_x$ storage component).

FIG. 5 shows an exemplary embodiment of a layered oxidation catalyst composite 60, with an axially zoned upper layer (72/74). Referring to FIG. 5, in one or more embodiments, the substrate 62 generally comprises a plurality of channels 64 of a honeycomb substrate, of which only one channel is show in cross-section for clarity. The substrate 62 has an inlet or upstream end 66 and an outlet or downstream end 68 and contains two separate catalytic coating layers. The substrate 62 has an axial length L. In one or more embodiments, the $NO_x$ storage component is an under layer 70 on the substrate 62, which extends from the inlet end 66 of the substrate 62 through the axial length L of the substrate 62 to the outlet end 66. The first and second oxidation components are in a zoned relationship coated as a zoned upper layer on the under layer 70. In one or more embodiments, the first oxidation component is on the inlet or upstream end, and the second oxidation component is on the outlet or downstream end. The first oxidation component 72 extends from the inlet end 66 of the substrate 62 through less than the entire axial length L of the substrate 62. The length of the first oxidation component zone 72 is denoted as first zone 72a in FIG. 5. The second oxidation component 74 extends from the outlet end 68 of the substrate 62 through less than the entire axial length L of the substrate 62. The length of the second catalytic coating zone 74 is denoted as second zone 74a in FIG. 5. According to one or more embodiments, the oxidation catalyst composite can again further comprise an undercoat layer (not shown) located between the substrate 62 and the under layer 70. In embodiments where the undercoat layer is present, the undercoat layer is coated over the substrate 62, and then the $NO_x$ storage component is an under layer 70 coated over (on top) of the undercoat layer, and first and second oxidation components are in a zoned relationship coated as a zoned upper layer on the under layer 70.

Referring to FIG. 5, in other embodiments, the first oxidation component is on the outlet or downstream end, and the second oxidation component is on the inlet or upstream end. The first oxidation component 74 extends from the outlet end 68 of the substrate 62 through less than the entire axial length L of the substrate 62. The length of the first oxidation component zone 74 is denoted as first zone 74a in FIG. 5. The second oxidation component 72 extends from the inlet end 66 of the substrate 62 through less than the entire axial length L of the substrate 62. The length of the second catalytic coating zone 72 is denoted as second zone 72a in FIG. 5.

It will be appreciated by one skilled in the art that the upstream zone and downstream zone can be at least partially overlapping. In one or more embodiments, the upstream zone is at least partially overlapping the downstream zone. In other embodiments, the downstream zone is at least partially overlapping the upstream zone. In one or more embodiments, the at least partial overlap is in the range of from about 0.1% to about 50%. In further embodiments, the upstream zone and the downstream zone may be directly abutting one another. In still further embodiments, there may be a gap between the upstream zone and the downstream zone. The first zone 74a and the second zone 72a can each have a respective length, and the ratio of the length of the first zone 74a to the length of the second zone 72a can be about 5:1 to about 1:5, about 4:1 to about 1:4, about 3:1 to about 1:3, about 2:1 to about 1:2, or about 1:1.

Emission Treatment System

The oxidation catalyst composite of one or more embodiments can be used in an integrated emission treatment system comprising one or more additional components for the treatment of diesel exhaust gas emissions. Thus, embodiments of a second aspect of the invention are directed to systems for treating a gaseous exhaust stream from a diesel engine. The exhaust gas stream can comprise hydrocarbons, carbon monoxide, nitrogen oxides, particulate matter, and other exhaust components. In one or more embodiments, the exhaust gas treatment system comprises an exhaust conduit in fluid communication with the diesel engine via an exhaust manifold; the oxidation catalyst composite of the present invention; and one or more of the following in fluid communication with the oxidation catalyst composite: a catalyzed soot filter (CSF) and a selective catalytic reduction (SCR) catalyst/article located downstream of the catalyzed soot filter. In one or more specific embodiments, the exhaust gas treatment system comprises an exhaust conduit in fluid communication with the diesel engine via an exhaust manifold; the oxidation catalyst composite of the present invention; and, in fluid communication with the oxidation catalyst composite, a selective catalytic reduction (SCR) catalyst/article and a catalyzed soot filter (CSF) located downstream of the SCR catalyst. In one or more specific embodiments, the exhaust gas treatment system comprises an exhaust conduit in fluid communication with the diesel engine via an exhaust manifold; the oxidation catalyst composite of the present invention; and, in fluid communication with the oxidation catalyst composite, a selective catalytic reduction catalyst/article coated directly onto the filter (SCR on a filter) and located downstream of the oxidation catalyst composite. An additional flow-through SCR catalyst may optionally be located downstream of the SCR on a filter.

In addition to treating the exhaust gas emissions via use of the oxidation catalyst composite according to one or more embodiments, a soot filter for removal of particulate matter may be used. Typically, the soot filter will be located downstream from the oxidation catalyst composite. In one or more embodiments, the soot filter is a catalyzed soot filter (CSF). The CSF may comprise a substrate coated with a catalytic coating layer containing one or more catalysts for burning off trapped soot and/or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of unburned hydrocarbons and to some degree particulate matter. The soot burning catalyst can be an oxidation catalyst comprising one or more platinum group metal (PGM) catalysts (platinum, palladium, and/or rhodium).

Figure 6:
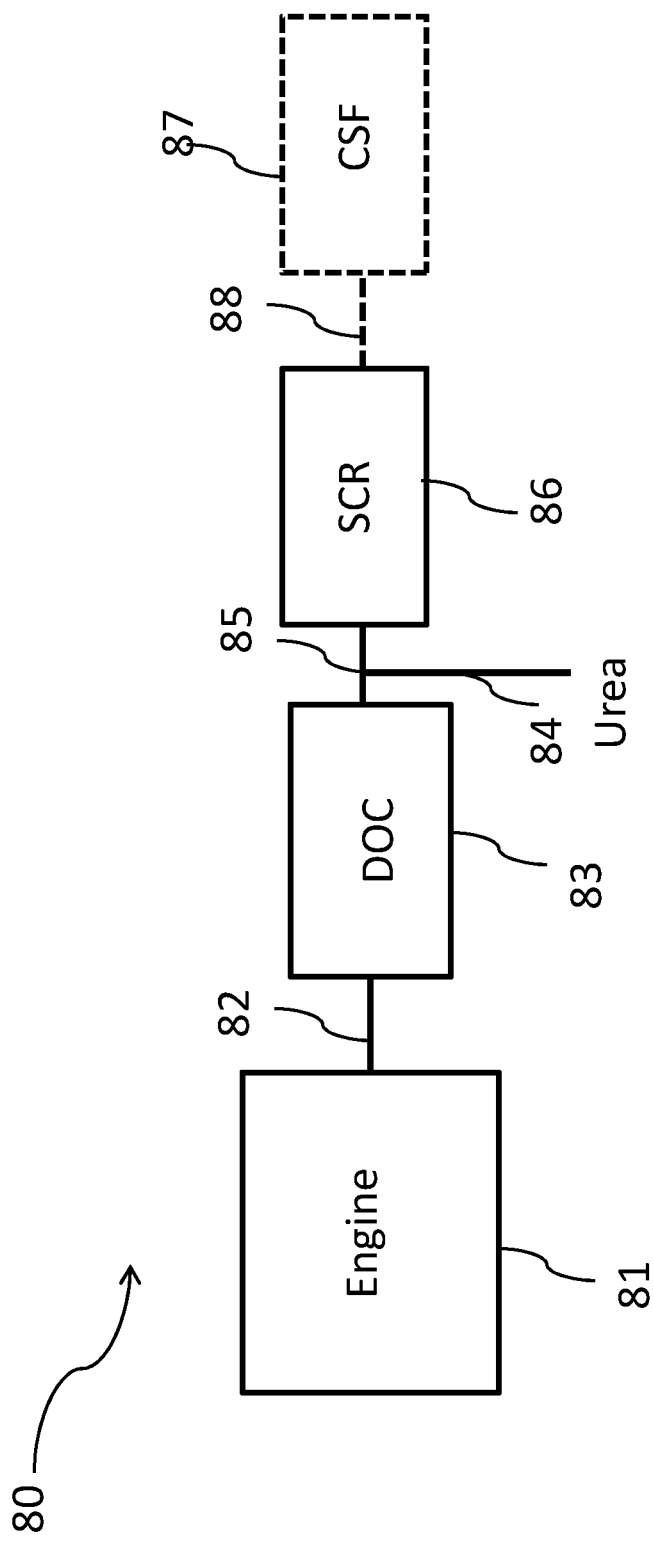
FIG. 6 is a schematic of an engine treatment system according to one or more embodiments.
Figure 7:
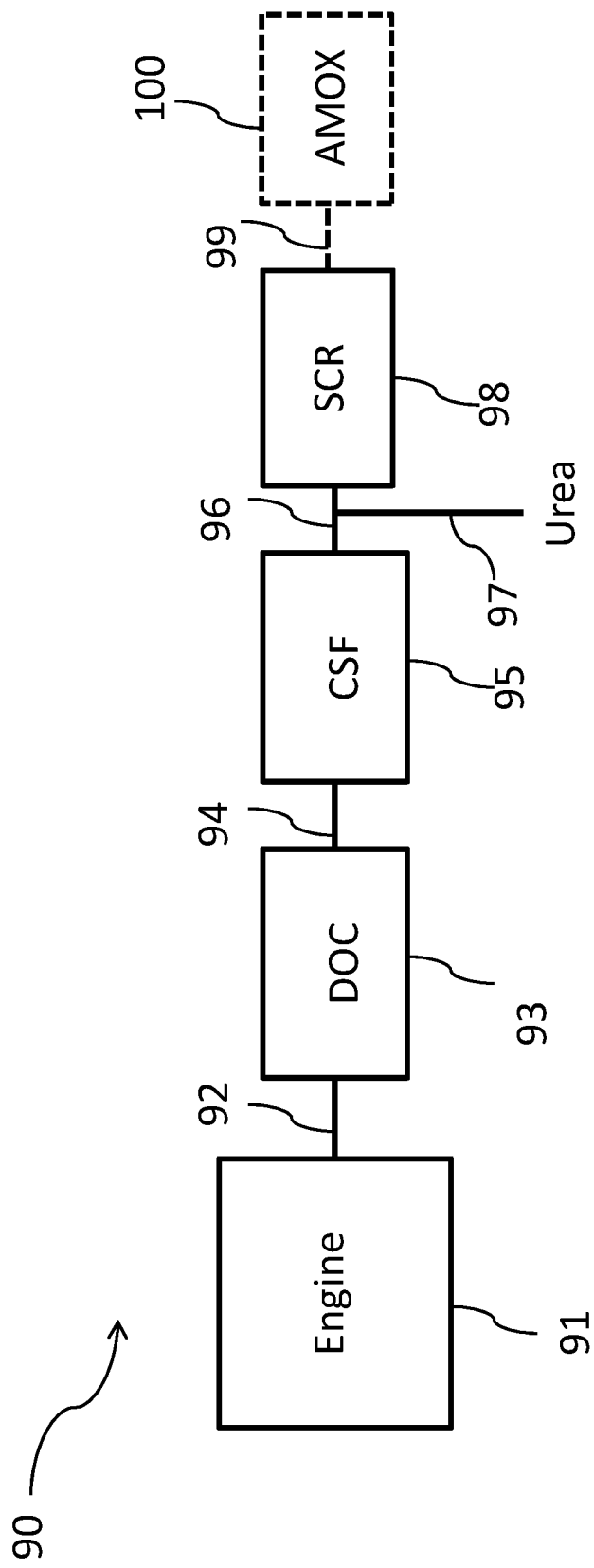
FIG. 7 is a schematic of an engine treatment system according to one or more embodiments.
Figure 8:
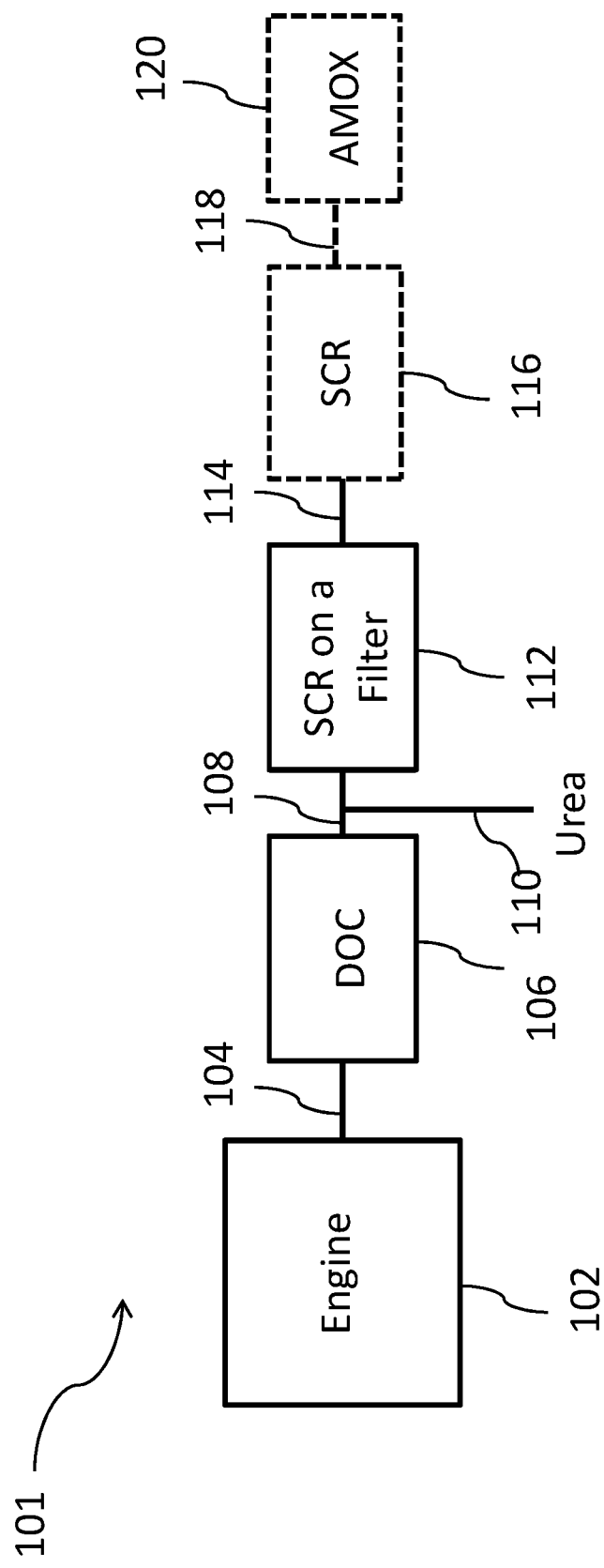
FIG. 8 is a schematic of an engine treatment system according to one or more embodiments.

Exemplary emission treatment systems may be more readily appreciated by reference to FIGS. 6-8, which depict schematic representations of an emission treatment system, in accordance with one or more embodiments of the present invention. FIG. 6 shows an exemplary embodiment of an emission treatment system 80 comprising an exhaust conduit 82 in fluid communication with a diesel engine 81 via an exhaust manifold; and the diesel oxidation catalyst composite 83 according to one or more embodiments. In the diesel oxidation catalyst composite 83, unburned gaseous and volatile hydrocarbons (i.e., the VOF) and carbon monoxide are largely combusted to form carbon dioxide and water. In addition, a proportion of the NO of the $NO_x$ component may be oxidized to $NO_2$ in the diesel oxidation catalyst (DOC). The exhaust stream is next conveyed via exhaust conduit line 85 to a downstream selective catalytic reduction (SCR) component 86. The SCR catalyst 86 is located immediately downstream from the oxidation catalyst 83 with no intervening catalyst material between the oxidation catalyst and the SCR catalyst. An ammonia precursor (e.g. aqueous urea) is injected via line 84 into the exhaust line 85. The exhaust gas stream with added ammonia is conveyed via line 85 the SCR component 86 for the treatment and/or conversion of $NO_x$. In a specific embodiment, an optional catalyzed soot filter (CSF) 87 may be placed downstream of the SCR catalyst and the exhaust gas stream may be conveyed to the CSF 87 via optional exhaust conduit 88.

In general, any known filter substrate can be used, including, e.g., a honeycomb wall flow filter, wound or packed fiber filter, open-cell foam, sintered metal filter, etc., with wall flow filters being particularly suitable. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.02 inches.

Typical wall flow filter substrates are composed of ceramic-like materials such as cordierite, α-alumina, silicon carbide, silicon nitride, aluminum titanate, zirconia, mullite, spodumene, alumina-silica-magnesia or zirconium silicate, or of porous, refractory metal. Filter substrates may also be formed of ceramic or metallic fiber composite materials.

In other embodiments, an exemplary emission treatment system may be more readily appreciated by reference to FIG. 7, which depicts a schematic representation of an emission treatment system 90. Referring to FIG. 7, an exhaust gas stream containing gaseous pollutants (e.g., unburned hydrocarbons, carbon monoxide and $NO_x$) and particulate matter is conveyed via an exhaust conduit line 92 from a lean burn engine 91 such as a diesel engine to a diesel oxidation catalyst (DOC) 93, which is in the form of the oxidation catalyst composite according to one or more embodiments of the present invention. In the DOC 93, unburned gaseous and volatile hydrocarbons (i.e., the VOF) and carbon monoxide are largely combusted to form carbon dioxide and water. In addition, a proportion of the NO of the $NO_x$ component may be oxidized to $NO_2$ in the DOC. The exhaust stream is next conveyed via exhaust line 94 to a catalyzed soot filter (CSF) 95, which traps particulate matter present within the exhaust gas stream. The CSF 95 is optionally catalyzed for passive regeneration. After removal of particulate matter, via CSF 95, the exhaust gas stream is conveyed via exhaust line 96. An ammonia precursor (e.g. aqueous urea) is injected via line 97 into the exhaust line 96. The exhaust gas stream with added ammonia is conveyed via line 96 to a downstream selective catalytic reduction (SCR) component 98 for the treatment and/or conversion of $NO_x$. In one or more embodiments, the exhaust gas stream can be conveyed via optional exhaust conduit 99 to an optional ammonia oxidation catalyst (AMOX) 100 placed downstream of the SCR component 98 to remove any slipped ammonia from the system. As used herein, the terms "ammonia destruction catalyst" or "ammonia oxidation catalyst (AMOX)" refer to a catalyst that promotes the oxidation of $NH_3$. In specific embodiments, the AMOX catalyst may comprise a platinum group metal such as platinum, palladium, rhodium, or combinations thereof.

Such AMOX catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOX catalyst comprising a zeolite.

AMOX and/or SCR catalyst composition(s) can be coated on the flow through or wall-flow filter. If a wall flow substrate is utilized, the resulting system will be able to remove particulate matter along with gaseous pollutants. The wall-flow substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

Another exemplary emission treatment system is shown in FIG. 8, which depicts a schematic representation of an emission treatment system 101. Referring to FIG. 8, an exhaust gas stream containing gaseous pollutants (e.g. unburned hydrocarbons, carbon monoxide and $NO_x$) and particulate matter is conveyed via exhaust line 104 from a lean burn engine 102 such as a diesel engine to a diesel oxidation catalyst (DOC) 106, which is in the form of the oxidation catalyst composite according to embodiments of the present invention. In the DOC 106, unburned gaseous and volatile hydrocarbons (i.e. the VOF) and carbon monoxide are largely combusted to form carbon dioxide and water. In addition, a proportion of the NO of the $NO_x$ component may be oxidized to $NO_2$ in the DOC. The exhaust stream is next conveyed via exhaust line 108. An ammonia precursor (e.g. aqueous urea) is injected via line 110 into the exhaust line 108. The exhaust gas stream with added ammonia is conveyed via line 108 to a selective catalytic reduction component supported within a catalytic soot filter (SCR on a filter) 112, to trap particulate matter present within the exhaust gas stream and treat and/or convert $NO_x$. Optionally, the exhaust gas stream may be conveyed via line 114 to a downstream selective catalytic reduction (SCR) component 116 for further treatment and/or conversion of $NO_x$. In one or more embodiments, the exhaust gas stream can be conveyed via optional exhaust conduit 118 to an optional ammonia oxidation catalyst (AMOX) 120 placed downstream of the SCR component 116 in order to remove any slipped ammonia from the system.

In these embodiments, a suitable SCR component is located downstream of a soot filter component. A suitable SCR catalyst component for use in the emission treatment system is able to effectively catalyze the reduction of the $NO_x$ component at temperatures below 600° C., so that adequate $NO_x$ levels can be treated even under conditions of low load which typically are associated with lower exhaust temperatures. In an embodiment, the catalyst article is capable of converting at least 50% of the $NO_x$ component to $N_2$, depending on the amount of reductant added to the system. Another desirable attribute for the composition is that it possesses the ability to selectively catalyze the oxidation of any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, specifically from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations. Other specific SCR compositions that may be used in accordance with one or more embodiments of the invention include 8-ring, small pore molecular sieves. As used herein, the term "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4-ring building units. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the SCR catalyst comprises a molecular sieve having a double six ring (d6r) unit. In a specific embodiment, the SCR catalyst comprises CHA, AEI, or AFX framework type zeolite. In a very specific embodiment, the SCR catalyst comprises CHA framework type zeolite. The SCR catalyst may contain a promoter metal, e.g. copper, iron, cobalt, nickel, lanthanum, cerium, manganese, vanadium, silver, or combinations thereof. More specifically, the SCR catalyst may contain a promoter metal selected from copper, iron, or combinations thereof. In one or more embodiments, exemplary CHA framework type zeolites have a silica to alumina ratio (SAR) greater than about 15, and copper content exceeding about 0.2 wt. %. In a more specific embodiment, the mole ratio of silica to alumina is from about 15 to about 256, and the copper content is from about 0.2 wt. % to about 5 wt. %. Other useful compositions for SCR include non-zeolitic molecular sieves having the CHA framework structure. For example, silicoaluminophosphates such as SAPO-34, SAPO-44, and SAPO-18 may be used in accordance with one or more embodiments. Other useful SCR catalysts can include a mixed oxide including one or more of $V_2O_5$, $WO_3$, and $TiO_2$.

Method of Treatment

A third aspect of the invention is directed to methods for treating a diesel exhaust gas stream comprising carbon monoxide, hydrocarbons, $NO_x$, and particulate matter. In one or more embodiments, the method comprises contacting an exhaust gas stream with the oxidation catalyst composite of the present invention.

Embodiments of the invention are now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

I. Thermal Gravimetric Analysis (TGA) for $NO_x$ Adsorption/Desorption

Test Definition: Thermal Gravimetric Analysis (TGA) was performed using a PerkinElmer Pyris 1 TGA. The following methodology was employed for $NO_2$ adsorption/desorption measurement: Ramp temperature to 600° C. in $N_2$ to dry the sample; cool to room temperature in $N_2$, hold for 20 min. Introduce flow of 1000 ppm $NO_2$/3000 ppm $O_2$ in $N_2$, hold for 120 min. Stop $NO_2/O_2$ flow, hold for 20 min in $N_2$. Temperature ramp to 600° C. stopping at 120° C., 250° C., and 350° C. for 20 min each.

The following materials were prepared:

A. Alumina Study

Pure Alumina: Reference 1

Preparation: Reference 1 sample is pure (100%) alumina, having a surface area of about 145 to 155 m²/g, a pore volume of 0.8 to 0.9 cc/g.

Alumina/Manganese: Example 1

Preparation: The amount of gamma-alumina powder was measured, and the weight was recorded. The powder was impregnated with manganese acetate solution to reach the desired concentration (3.3% MnO). The sample was dried at 120° C. for an hour, then it was calcined in air at 500° C. for 1 h. Example 1 has the composition Al/Mn (95/5).

Alumina/Ceria/Manganese: Example 2

Preparation: The amount of Mn-coated gamma-alumina powder from Example 1 was measured, and the weight was recorded. The powder was impregnated with cerium-nitrate solution to reach the desired concentration (3.2% $CeO_2$). The sample was dried at 120° C. for an hour and calcined in air at 500° C. for 1 h. Example 2 has the composition Al/Ce/Mn (90/5/5).

The prepared powder samples were aged according to the following aging procedure: 800° C./10% $H_2O$/Air/25 hours in a tube furnace.

Testing: The TGA testing results for the alumina samples are presented in Table 1.

TABLE 1

| Support Powder | Adsorption at 120° C. (fresh) % | Adsorption at 120° C. (aged) % | Desorption at 350° C. (fresh) % | Desorption at 350° C. (aged) % |
|---|---|---|---|---|
| Reference 1 ($Al_2O_3$) | 3.3 | 2.0 | 28.7 | 44.7 |
| Example 1 (Mn/$Al_2O_3$) | 3.2 | 2.4 | 72.8 | 81.6 |
| Example 2 (Ce/Mn/$Al_2O_3$) | 3.6 | 2.2 | 85.9 | 93.8 |

Results: Table 1 illustrates that desorption properties are enhanced by the Mn incorporation into alumina. Percent adsorption at 120° C. is defined as the weight gain (g) due to $NO_2$ adsorption, after 120° C., 20 min. stabilization in $N_2$ divided by the weight (g) at room temperature after 600° C. drying, in wt. %. Percent desorption is defined as the total weight loss (g) from 120° C. to 350° C. divided by the total adsorption weight (g) as defined above, in wt. %. Mn-impregnated alumina (Example 1) and Ce/Mn impregnated alumina offer similar $NO_x$ adsorption capacity to the alumina Reference 1, fresh or aged. Mn-impregnated alumina (Example 1) desorbs a higher percentage of adsorbed $NO_x$ by 350° C. than the alumina Reference 1, fresh or aged. Ce/Mn-impregnated alumina (Example 2) desorbs an even higher percentage of adsorbed $NO_x$ than Mn/alumina (Example 1), fresh or aged.

B. Ceria Study

Pure Ceria: Reference 2

Preparation: Reference 2 sample is pure (100%) ceria, having a surface area of about 140 to 160 m²/g, a pore volume of 0.3 to 0.4 cc/g.

Ceria/Silica: Example 3

Preparation: Tetraethylorthsilicate (TEOS) was dissolved in ethanol. Ceria (Reference 2) was impregnated with TEOS/EtOH. The ceria was soaked at room temperature for about 30 min, followed by heating in an oven at 110° C. for 2 hours. The material was calcined in a furnace at 550° C. The final material had 1.0% silica on ceria. Example 3 has the composition Ce/Si (99/1).

Ceria/Silica: Example 4

Preparation: Example 4 was prepared according to the same preparation process of Example 3, using a different concentration of TEOS/EtOH. The final material had 5.0% silica on ceria. Example 4 has the composition Ce/Si (95/5)

Ceria/Manganese: Example 5

Preparation: The amount of ceria powder (Reference 2) was measured, and the weight was recorded. The powder was impregnated with manganese acetate solution to reach the desired concentration (0.1% MnO). The sample was dried at 120° C. for an hour, and then calcined in air at 500° C. for 1 h. Example 5 has the composition Ce/Mn (99.9/0.1).

Ceria/Manganese: Example 6

Preparation: Example 6 was prepared according to the process of Example 5, but the final powder had a concentration of 5.0% MnO on ceria. Example 6 has the composition Ce/Mn (95/5).

Testing: The TGA testing results for the ceria samples are presented in Table 2.

TABLE 2

| Support Powder | Adsorption at 120° C. (fresh) % | Adsorption at 120° C. (aged) % | Desorption at 350° C. (fresh) % | Desorption at 350° C. (aged) % |
|---|---|---|---|---|
| Reference 2 ($CeO_2$) | 5.4 | 1.9 | 52.8 | 79.9 |
| Example 3 (1% Si/$CeO_2$) | 3.6 | 1.8 | 62.6 | 81.4 |
| Example 4 (5% Si/$CeO_2$) | 2.6 | 1.3 | 71.0 | 85.3 |
| Example 5 (0.1% Mn/$CeO_2$) | 4.1 | 1.7 | 71.7 | 88.7 |
| Example 6 (5% Mn/$CeO_2$) | 2.9 | 0.8 | 84.6 | 91.0 |

Results: Table 2 illustrates that Si-impregnated ceria (Example 3) offers a higher percent desorption between 120-350° C. while reducing the $NO_x$ adsorption capacity at 120° C., compared to the ceria Reference 2, fresh or aged. Increasing the Si loading onto ceria (Example 4), enhances desorption properties, while further reducing $NO_x$ adsorption capacity. Mn-impregnated ceria (Example 5) also offers a higher percent desorption while reducing $NO_x$ adsorption capacity, compared to the ceria Reference 2. Increasing the Mn loading onto ceria (Example 6), enhances the desorption property, while reducing further $NO_x$ adsorption capacity.

II. Powder Testing without PGM

Powder testing in a lab reactor was conducted with a feed gas stream of NO/$NO_2$/$O_2$/$H_2O$ in $N_2$. The following procedures were employed for $NO_2$ adsorption/desorption measurements: A powder sample with a weight of 1.5 g (diluted with corundum to 3 ml bed volume) was loaded into the reactor. The reactor was purged with $N_2$ at 120° C.; the feed gas, with a composition of NO (100 ppm), $NO_2$ (100 ppm), $O_2$ (10%), $H_2O$ (5%), $N_2$ (Balance), was introduced into the reactor for 30 minutes (adsorption phase); the NO/$NO_2$ feed gas was then turned off and the reactor was ramped to 600° C., at a rate of 30° C./min. NO/$NO_2$ was quantified by means of a chemilumiscent gas analyzer. $NO_x$ adsorption was quantified by integrating the area under the curve of $NO_x$ concentration vs. Time at 120° C. for 30 min. Similarly, $NO_x$ desorption was quantified by integrating the measured $NO_x$ evolved from the catalyst powder during the intervals of 200-400° C. and 200-600° C.

Powder samples were prepared as Examples 1 to 5 above.

The powders were pressed into a pellet, then crushed and sieved to achieve a particle size between 250-500 μm. The powders were aged at 800° C. for 16 h, 10% $H_2O$ in air.

Table 3 shows the compositional formulations of the samples.

TABLE 3

| Sample # | Manganese (wt. %) | Ceria (wt. %) | Silica (wt. %) | Alumina (wt. %) |
|---|---|---|---|---|
| Reference 1 | — | — | — | 100 |
| Reference 2 | — | 100 | — | — |
| Example 1 | 5 | — | — | 95 |
| Example 2 | 5 | 5 | — | 90 |
| Example 3 | — | 99 | 1 | — |
| Example 4 | — | 95 | 5 | — |
| Example 5 | 0.1 | — | — | 99.9 |

Table 4 shows the $NO_x$ desorption properties of the powder samples.

TABLE 4

| Sample # | Total $NO_x$ Desorbed (mg) | Total $NO_x$ Desorbed from 200-400° C. (mg) | Total $NO_x$ Desorbed from 200-400° C. (% of total desorbed) |
|---|---|---|---|
| Reference 1 | 9.5 | 0.3 | 3.1 |
| Example 1 | 10.5 | 7.1 | 67.9 |
| Example 2 | 13.8 | 10.7 | 77.7 |
| Reference 2 | 21.7 | 3.3 | 15.3 |
| Example 3 | 15.8 | 2.9 | 18.5 |
| Example 4 | 7.3 | 2.0 | 27.1 |

The addition of Mn and Mn/Ce to alumina enhances the $NO_x$ desorption properties of alumina. The addition of silica onto ceria enhances the $NO_x$ desorption property of ceria.

Example 6: Other Dopants

As observed in Table 2, Si and Mn both enhance the $NO_x$ desorption property of pure ceria. Several other dopants were incorporated into ceria to compare the effects of impregnation of the various dopants, especially in CO light-off activity. Table 5 shows the Sample formulations.

TABLE 5

| Sample | Mn (wt. %) | Other dopant (wt. %) | Ceria (wt. %) |
|---|---|---|---|
| Reference 2 ($CeO_2$) | — | — | 100 |
| Example 5 (0.1% Mn/$CeO_2$) | 0.1 | — | 99.9 |
| Example 6A (0.1% Ni/$CeO_2$) | — | 0.1 (Ni) | 99.9 |
| Example 6B (0.1% Pr/$CeO_2$) | — | 0.1 (Pr) | 99.9 |
| Example 6C (0.1% Fe/$CeO_2$) | — | 0.1 (Fe) | 99.9 |
| Example 6D (0.1% Sb/$CeO_2$) | — | 0.1 (Sb) | 99.9 |
| Example 6E (0.1% Ti/$CeO_2$) | — | 0.1 (Ti) | 99.9 |

Testing: 100 mg of sample was diluted to a sample volume of 1 mL (with corundum). Measurement time: 3 min equilibration time plus 30 s sampling time. Temperature (° C.): 120, 135, 150, 165, 180, 195, 210, 225, 250, 300, 350° C.; GHSV: 50000 $h^{-1}$; Feed Composition: 700 ppm CO, 190 ppm-$C_1$ HC (130 ppm from decane, 60 ppm from propylene), 40 ppm NO, 10% $O_2$, 6% $CO_2$, 5% $H_2O$. Two runs of each catalyst were performed, and the data from the second run was used for catalyst ranking.

Table 6 presents the results from the testing. The samples were aged at 800° C. for 20 hr in 10% $H_2O$ in air.

TABLE 6

| Sample # | CO L/O $T_{50}$, ° C. (aged) | HC Conversion at 350° C. (aged), % | $NO_2$ Yield at 350° C. (aged), % |
|---|---|---|---|
| Reference 2 ($CeO_2$) | 343 | 56 | 2 |
| Example 5 (0.1% Mn/$CeO_2$) | 317 | 46 | 3 |
| Example 6A (0.1% Ni/$CeO_2$) | 325 | 47 | 1 |
| Example 6B (0.1% Pr/$CeO_2$) | 326 | 43 | 3 |
| Example 6C (0.1% Fe/$CeO_2$) | 335 | 38 | 2 |
| Example 6D (0.1% Sb/$CeO_2$) | 348 | 49 | 2 |
| Example 6E (0.1% Ti/$CeO_2$) | >350 | 51 | 1 |

Table 6 illustrates the CO light-off performance of various base metal-doped ceria catalysts compared to the ceria Reference 2, after aging. While none of these ceria-based compounds offers a practical $NO_2$ yield at 350° C. after aging, Mn, Ni, and Pr provide an enhancement in CO light-off activity.

III. Monolith Testing of Multilayer Catalysts

Preparation of Monolith Samples:

The following catalytic coating layers were prepared in order to coat a substrate and prepare the multilayer catalysts.

First Oxidation Component—A washcoat for the first oxidation component was prepared as follows: A support material comprising ceria powder (Reference 2) was impregnated with Pd nitrate using incipient wetness techniques. Subsequently, the same support material was impregnated with barium oxide. The resulting Pd and Ba-impregnated ceria powder was calcined. Gamma-alumina (Reference 1) was added. The pH was adjusted using $HNO_3$ and milled to reduce the particle size to 90% less than about 7.3 μm. The washcoat loading for the first oxidation component was approximately 0.8 $g/in^3$, with a Pd loading of 23 $g/ft^3$, and a Ba loading of 45 $g/ft^3$.

Second Oxidation Component—A washcoat for the second oxidation component was prepared as follows: A support material comprising alumina and manganese (Example 1) was impregnated with a Pt-amine solution using incipient wetness techniques. The resulting Pt-impregnated Mn-alumina powder was diluted with deionized water. The pH of the resulting aqueous slurry was adjusted to pH about 4.5 by the addition of $HNO_3$. The slurry was mixed and then milled to a particle size of about 23 μm. Zeolite was added to the slurry with mixing. The washcoat loading for the second oxidation component was approximately 1.4 $g/in^3$ for a Pt loading 47 $g/ft^3$.

$NO_x$ Storage Component A—A washcoat for $NO_x$ storage component A was prepared as follows: A support material comprising alumina and manganese (Example 1) was diluted with water. Gamma alumina (Reference 1) was added to the slurry with mixing. The pH was adjusted to about 4 using $HNO_3$. The slurry was milled to a particle size of about 23 μm (90%). Zeolite was added to the slurry with mixing. The washcoat loading for the $NO_x$ storage component A was approximately 1.1 $g/in^3$ when coated onto a 400 cpsi substrate, and the washcoat loading for the $NO_x$ storage component A was approximately 1.7 $g/in^3$ when loaded onto a 600 cpsi substrate.

$NO_x$ Storage Component B—A washcoat for $NO_x$ storage component B was prepared as follows: A support material comprising Ceria (Reference 2) was diluted with water. Gamma alumina (Reference 1) was added, and the slurry was mixed. The pH was adjusted to about 4 using $HNO_3$. The slurry was milled to a particle size of about 7 μm (90%). Zeolite and alumina binder were added to the slurry, and the slurry was mixed well. The washcoat loading for the $NO_x$ storage component B was approximately 1.2 g/in$^3$.

$NO_x$ Storage Component C—A washcoat for $NO_x$ storage component C was prepared as follows A support material comprising Si-Ceria (Example 3) was diluted with water. Gamma alumina (Reference 1) was added, and the slurry was mixed. The pH was adjusted to about 5 using $HNO_3$. The slurry was milled to a particle size of about 7 μm (90%). Zeolite was added to the slurry, followed by addition of alumina binder, and the slurry was mixed. The washcoat loading for the $NO_x$ storage component C was approximately 1.2 g/in$^3$.

$NO_x$ Storage Component D—A washcoat for $NO_x$ storage component E was prepared as follows: A support material comprising Mn-Ceria-Alumina (Example 2) was diluted with water. The pH was adjusted to about 5 using $HNO_3$. The slurry was milled to a particle size of about 13 μm (90%). Zeolite was added to the slurry, and the slurry was mixed. The washcoat loading for the $NO_x$ storage component E was approximately 1.7 g/in$^3$.

Reference 3: Two Layer Catalyst

The washcoat slurry of the first oxidation component was coated onto 400 cpsi cordierite substrate. The coated monolith was dried and then calcined in the range of 400-550° C. for 2-4 hours. The slurry of the second washcoat was coated onto the cordierite substrate over the first washcoat. The coated monolith was dried and then calcined in the range of 400-550° C. for 2-4 hours to provide a two-layer reference catalyst.

Example 7—Three-Layer Catalyst

The washcoat slurry of the first oxidation component was coated onto a 400 cpsi cordierite substrate. The coated monolith was dried and then calcined in the range of 400-550° C. for 2-4 hours. The washcoat slurry of the $NO_x$ storage component A was coated onto the cordierite substrate over the first oxidation component. The coated monolith was dried and then calcined in the range of 400-550° C. for 2-4 hours. Then the washcoat slurry of the second oxidation component was coated over the $NO_x$ storage component A to provide a 3-layer catalyst. The coated monolith was dried and then calcined in the range of 400-550° C. for 2-4 hrs.

Example 8—Three-Layer Catalyst

The washcoat slurry for the $NO_x$ storage component A was coated onto a 400 cpsi cordierite substrate. The coated monolith was dried and then calcined in the range of 400-550° C. for 2-4 hours. The washcoat slurry of the first oxidation component was coated onto the cordierite substrate over the $NO_x$ storage component A. The coated monolith was dried and then calcined in the range of 400-550° C. for 2-4 hours. Then the washcoat slurry of the second oxidation component was coated over the first oxidation component to provide a 3-layer catalyst. The coated monolith was dried and then calcined in the range of 400-550° C. for 2-4 hrs.

Monolith sample aging: The catalyzed monoliths were aged according to the following aging procedure: 800° C./10% $H_2O$/Air/25 hours in a tube furnace with a thermocouple located at the inlet face of the monolith.

Figure 9:
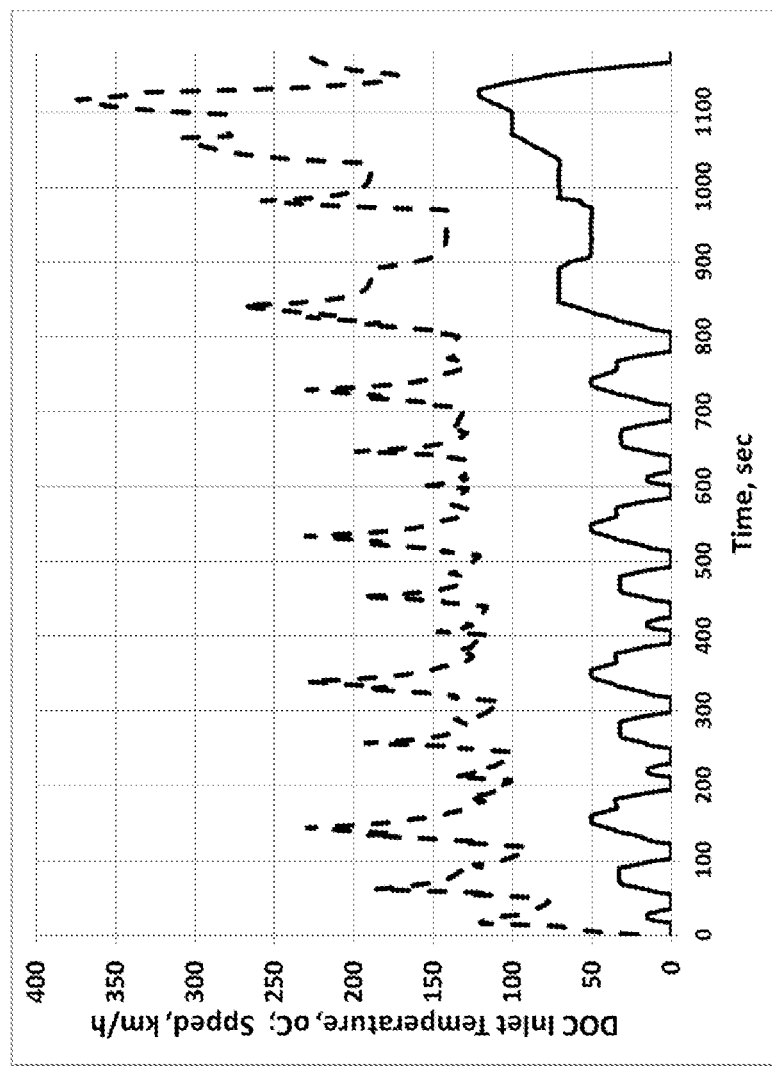
FIG. 9 is a graph of the DOC inlet temperature and speed versus time.

Monolith sample testing: The typical Euro-6 NEDC protocol was followed to determine catalyst performance for CO and HC oxidation and $NO_2$ formation, averaged over the entire NEDC cycle. A typical temperature and speed profile for the NEDC protocol is shown in FIG. 9.

Test Results:

Steady-state no oxidation resting:

NO oxidation to $NO_2$ was quantified at 180° C. (SV-25,000/h and 100 ppm NO), 250° C. (33,000/h and 250 ppm NO) and 310° C. (52,000/h and 500 ppm NO). Results are shown in Table 7.

TABLE 7

| Sample # | $NO_2$/$NO_x$ % @ 180° C. (fresh) | $NO_2$/$NO_x$ % @ 250° C. (fresh) | $NO_2$/$NO_x$ % @ 310° C. (fresh) | $NO_2$/$NO_x$ % @ 180° C. (aged) | $NO_2$/$NO_x$ % @ 250° C. (aged) | $NO_2$/$NO_x$ % @ 310° C. (aged) |
|---|---|---|---|---|---|---|
| Ref 3 | 17.6 | 63.5 | 62.1 | 0 | 56.0 | 49.2 |
| Ex. 7 | 24.5 | 67.2 | 63.5 | 2.9 | 62.3 | 60.4 |
| Ex. 8 | 32.5 | 69.0 | 66.4 | 16.9 | 64.0 | 56.7 |

The results from Table 7 show enhancement in steady-state $NO_2$/$NO_x$ performance, by adding a non-PGM low temperature $NO_x$ desorption layer, either as the bottom or middle layer.

Table 8 presents the NEDC Euro-6 protocol results.

TABLE 8

| Sample # | CO % Conversion (fresh) | HC % Conversion (fresh) | NO % Conversion (fresh) | CO % Conversion (aged) | HC % Conversion (aged) | NO % Conversion (aged) |
|---|---|---|---|---|---|---|
| Ref 3 | 91.7 | 89.0 | 55.0 | 77.8 | 75.2 | 40.5 |
| Ex. 7 | 91.3 | 89.1 | 56.1 | 77.5 | 75.5 | 48.6 |
| Ex. 8 | 89.2 | 89.2 | 55.9 | 78.6 | 76.0 | 43.8 |

Under the transient NEDC cycle, results from Table 8 indicate a strong benefit from the addition of a non-PGM NOx desorption layer, particularly in NO conversion, after aging.

Reference 4: Two Layer Catalyst

The washcoat slurry of the first oxidation component was coated onto 600 cpsi cordierite substrate. The coated monolith was dried and then calcined in the range of 400-550° C. for 2-4 hours. The slurry of the second oxidation component was coated onto the cordierite substrate over the first oxidation component. The coated monolith was dried and then calcined in the range of 400-550° C. for 2-4 hours to provide a two-layer reference catalyst.

Example 9—Three-Layer Catalyst

The washcoat slurry of the first oxidation component was coated onto a 600 cpsi cordierite substrate. The coated monolith was dried and then calcined in the range of 400-550° C. for 2-4 hours.

The washcoat slurry of the $NO_x$ storage component B was coated over the first oxidation component. The coated monolith was dried and then calcined in the range of 400-550° C. for 2-4 hours.

The washcoat slurry of the second oxidation component was then coated over the $NO_x$ storage component B. The coated monolith was dried and then calcined in the range of 400-550° C. for 2-4 hours to provide a three-layer catalyst.

Example 10—Three-Layer Catalyst

The washcoat slurry of the first oxidation component was coated onto a 600 cpsi cordierite substrate. The coated monolith was dried and then calcined in the range of 400-550° C. for 2-4 hours.

The washcoat slurry of the $NO_x$ storage component C was coated over the first oxidation component. The coated monolith was dried and then calcined in the range of 400-550° C. for 2-4 hours.

The washcoat slurry of the second oxidation component was then coated over the $NO_x$ storage component C. The coated monolith was dried and then calcined in the range of 400-550° C. for 2-4 hours to provide a three-layer catalyst.

Example 11—Three-Layer Catalyst

The washcoat slurry of the first oxidation component was coated onto a 600 cpsi cordierite substrate. The coated monolith was dried and then calcined in the range of 400-550° C. for 2-4 hours.

The washcoat slurry of the $NO_x$ storage component A was coated over the first oxidation component. The coated monolith was dried and then calcined in the range of 400-550° C. for 2-4 hours.

The washcoat slurry of the second oxidation component was then coated over the $NO_x$ storage component A. The coated monolith was dried and then calcined in the range of 400-550° C. for 2-4 hours to provide a three-layer catalyst.

Example 12—Three-Layer Catalyst

The washcoat slurry of the first oxidation component was coated onto a 600 cpsi cordierite substrate. The coated monolith was dried and then calcined in the range of 400-550° C. for 2-4 hours.

The washcoat slurry of the $NO_x$ storage component D was coated over the first oxidation component. The coated monolith was dried and then calcined in the range of 400-550° C. for 2-4 hours.

The washcoat slurry of the second oxidation component was then coated over the $NO_x$ storage component D. The coated monolith was dried and then calcined in the range of 400-550° C. for 2-4 hours to provide a three-layer catalyst.

Monolith sample aging: The catalyzed monoliths were aged according to the following aging procedure: 800° C./10% $H_2O$/Air/25 hours in a tube furnace with a thermocouple located at the inlet face of the monolith.

Monolith sample testing: The typical Euro-6 NEDC protocol was followed to determine catalyst performance for CO and HC oxidation and $NO_2$ formation, averaged over the entire NEDC cycle.

Test Results:

Table 9 presents the NO light-off protocol results.

TABLE 9

| Sample # | $NO_2/NO_x$ % @ 180° C., (aged) | $NO_2/NO_x$ % @ 250° C., (aged) | $NO_2/NO_x$ % @ 310° C., (aged) |
|---|---|---|---|
| Ref 4 | 0 | 55.1 | 50.2 |
| Ex. 9 | 0 | 50.7 | 47.8 |
| Ex. 10 | 0 | 63.0 | 58.8 |
| Ex. 11 | 0 | 52.3 | 47.8 |
| Ex. 12 | 3.4 | 62.8 | 58.0 |

Results from Table 9 show that the Si/ceria compound (Example 10), which has higher NOx desorption properties than ceria alone at a temperature below 350° C., offers an improved $NO_2/NO_x$ performance than the ceria-only mid layer catalyst (Example 9). Also, the Ce/Mn/Al compound-containing mid layer catalyst (Example 12) provides a higher $NO_2/NO_x$ performance than the catalyst containing Mn/Al (Example 11).

Table 10 presents the NEDC Euro-6 protocol results.

TABLE 10

| Sample # | CO Conversion, % (aged) | HC Conversion, % (aged) | NO Conversion, % (aged) |
|---|---|---|---|
| Reference 4 | 77.5 | 75.6 | 38.5 |
| Example 9 | 73.0 | 71.8 | 32.6 |
| Example 10 | 81.0 | 86.7 | 50.0 |
| Example 11 | 85.1 | 77.7 | 46.4 |
| Example 12 | 88.9 | 82.9 | 50.8 |

Results from Table 10 show that the use of Si/ceria compound (Example 10) enhances overall performance of the catalyst, over the ceria-containing catalyst (Example 9), and the Ce/Mn/Al compound-containing mid layer catalyst (Example 12) also offers a higher overall performance than the catalyst containing Mn/Al (Example 11).

IV. Sulfation/Desulfation

The sulfation protocol was defined as: at an inlet temperature of 250° C.; SV=35,000 $hr^{-1}$; $O_2$=10%; Water=5%; $SO_2$=15 ppm, for a duration of 88 minutes (to give 1 g/L S exposure to the catalyst).

The de-sulfation protocol is defined as: at an inlet temperature of 350° C.; SV=35,000 $hr^{-1}$; $O_2$=12.5%; Water=5%; Inject Dodecane at a concentration of 2750 ppm for a duration of 10 minutes (to give a DOC outlet temperature of 650° C.)

Sulfur Resistance in $NO_2$ Performance

Example 13 fresh samples from Example 9 and Example 10 underwent a stabilization step (calcination at 600° C. for 4 hours, with 10% $H_2O$ and air), before the sulfation and desulfation process.

TABLE 11

(NO light-off protocol):

| | $NO_2/NO_x$ @ 180° C., % | $NO_2/NO_x$ @ 250° C., % | $NO_2/NO_x$ @ 310° C., % |
|---|---|---|---|
| Catalyst, Stabilized | | | |
| Reference 4 | 51.8 | 82.5 | 76.6 |
| Example 9 | 33.9 | 80.8 | 76.0 |
| Example 10 | 21.4 | 68.5 | 65.0 |
| Catalyst, after sulfation (1 g/L S) | | | |
| Reference 4 | 52.3 | 80.9 | 76.2 |
| Example 9 | 39.5 | 76.9 | 73.5 |
| Example 10 | 20.3 | 67.0 | 64.6 |
| Catalyst, after de-S (650° C., 10 min) | | | |
| Reference 4 | 53.7 | 83.9 | 77.0 |
| Example 9 | 54.0 | 82.2 | 76.2 |
| Example 10 | 9.6 | 70.3 | 65.2 |

TABLE 12

(NEDC Euro-6 protocol):

| | CO Conversion, % | HC Conversion, % | NO Conversion, % | $NO_2/NO_x$ in NEDC, % |
|---|---|---|---|---|
| Catalyst, Stabilized | | | | |

TABLE 12-continued (NEDC Euro-6 protocol):

| | CO Conversion, % | HC Conversion, % | NO Conversion, % | $NO_2/NO_x$ in NEDC, % |
|---|---|---|---|---|
| Reference 4 | 87.7 | 87.5 | 73.2 | 60.1 |
| Example 9 | 89.2 | 88.5 | 74.4 | 60.4 |
| Example 10 | 87.0 | 87.3 | 66.8 | 53.0 |
| Catalyst, after sulfation (1 g/L S) | | | | |
| Reference 4 | 77.1 | 84.5 | 67.8 | 54.1 |
| Example 9 | 79.4 | 85.5 | 71.1 | 57.4 |
| Example 10 | 79.9 | 84.4 | 65.1 | 54.0 |
| Catalyst, after de-S (650° C., 10 min) | | | | |
| Reference 4 | 80.6 | 86.2 | 68.4 | 53.1 |
| Example 9 | 82.3 | 86.8 | 70.6 | 55.0 |
| Example 10 | 80.6 | 85.1 | 61.4 | 53.2 |

Results from Tables 11 and 12 show that the stability of NO conversion has been improved by incorporation of the low temperature $NO_x$ desorption layer, compared to the two layer reference catalyst (Reference 4).

Example 14

Aged samples from Examples 11 and 12 were sulfated and desulfated according to the specified protocols. Results:

TABLE 13

(NEDC Euro-6 protocol):

| | CO Conversion, % | HC Conversion, % | NO Conversion, % | $NO_2/NO_x$ in NEDC, % |
|---|---|---|---|---|
| Catalyst, Aged | | | | |
| Reference 4 | 77.5 | 75.6 | 38.5 | 31.7 |
| Example 11 | 85.1 | 77.7 | 46.4 | 32.7 |
| Example 12 | 88.9 | 82.9 | 50.8 | 34.9 |
| Catalyst, After sulfation (1 g/L S) | | | | |
| Reference 4 | 56.9 | 71.9 | 40.8 | 28.3 |
| Example 11 | 60.4 | 66.4 | 47.0 | 34.0 |
| Example 12 | 64.3 | 74.5 | 42.3 | 37.2 |
| Catalyst, After de-S (@ 650° C.) | | | | |
| Reference 4 | 68.1 | 75.3 | 46.5 | 32.1 |
| Example 11 | 60.4 | 66.4 | 47.0 | 34.0 |
| Example 12 | 71.0 | 77.2 | 51.7 | 36.8 |

Results from Table 13 show that the addition of the low temperature $NO_x$ desorption layer enhances the stability of the $NO_2$ performance against sulfur, hence providing the sulfur tolerance needed for automotive applications.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

The invention claimed is:

1. A system for treatment of a lean burn engine exhaust gas stream comprising hydrocarbons, carbon monoxide, nitrogen oxides, particulate matter, and other exhaust components, the system comprising:
    an exhaust conduit in fluid communication with a lean burn engine via an exhaust manifold;
    an oxidation catalyst composite; and
    a catalyzed soot filter and a selective catalytic reduction (SCR) catalyst located downstream from the oxidation catalyst composite;
    wherein the oxidation catalyst composite comprises:
        a carrier substrate; and
        a catalytic coating on at least a portion of the carrier substrate, the catalytic coating including:
            a first oxidation component comprising a platinum (Pt) component, a palladium (Pd) component and a refractory metal oxide, wherein the first oxidation component is substantially free of zeolite;
            a NOx storage component comprising ceria and one or more of alumina, silica, titania, and manganese; and
            a second oxidation component comprising a second refractory metal oxide, a zeolite, and platinum (Pt) component,
        wherein the first oxidation component comprises the Pt component to the Pd component in a weight ratio of about 0:1 to 4:1,
        wherein the NOx storage component is substantially free of platinum, palladium, and zirconia,
        wherein the NOx storage component comprises a ceria in a range from about 80-99.8 wt. %, alumina in a range from about 0.1 to 10 wt. %, and silica in a range from about 0.1 to 10 wt. % based on a weight of the NOx storage component,
        wherein the second oxidation component is substantially free of palladium, wherein the first oxidation component is in an under layer on the carrier substrate, the NOx storage component is in a middle layer on the under layer, and the second oxidation component is in an upper layer on the middle layer.

2. The system of claim 1, wherein the SCR catalyst is present as the catalytic coating on the catalyzed soot filter.

3. The system of claim 1, wherein the SCR catalyst is on a flow through monolith downstream from the oxidation catalyst composite, and the catalyzed soot filter is downstream from the SCR catalyst.

4. The system of claim 1, wherein the catalyzed soot filter is downstream of the oxidation catalyst composite and the SCR catalyst is on a flow through monolith downstream from the catalyzed soot filter.

5. The system of claim 1, wherein the SCR catalyst comprises a molecular sieve having a double six ring (d6r) unit.

6. The system of claim 5, wherein the SCR catalyst is selected from CHA, AEI, or AFX framework type zeolite.

7. The system of claim 6, wherein the SCR catalyst is promoted with a metal selected from Cu, Fe, Co, Ni, La, Ce, Mn, V, Ag, and combinations thereof.

8. The system of claim 7, wherein the SCR catalyst is promoted with a metal selected from Cu, Fe, and combinations thereof.

* * * * *